(12) United States Patent
Kuroda et al.

(10) Patent No.: US 8,116,506 B2
(45) Date of Patent: Feb. 14, 2012

(54) SPEAKER, IMAGE ELEMENT PROTECTIVE SCREEN, CASE OF TERMINAL AND TERMINAL

(75) Inventors: Jun Kuroda, Tokyo (JP); Hideki Ueda, Tokyo (JP); Yukio Murata, Tokyo (JP); Ukyo Mori, Tokyo (JP); Yasuhiro Sasaki, Tokyo (JP); Yasuharu Ohnishi, Tokyo (JP)

(73) Assignee: NEC Corporation, Tokyo (JP)

( * ) Notice: Subject to any disclaimer, the term of this patent is extended or adjusted under 35 U.S.C. 154(b) by 957 days.

(21) Appl. No.: 12/064,779

(22) PCT Filed: Nov. 2, 2006

(86) PCT No.: PCT/JP2006/322405
§ 371 (c)(1),
(2), (4) Date: Feb. 25, 2008

(87) PCT Pub. No.: WO2007/052835
PCT Pub. Date: May 10, 2007

(65) Prior Publication Data
US 2009/0103767 A1    Apr. 23, 2009

(30) Foreign Application Priority Data
Nov. 2, 2005    (JP) .................................. 2005-319920

(51) Int. Cl.
*H04R 1/02*    (2006.01)
(52) U.S. Cl. ........................................ 381/388; 381/107
(58) Field of Classification Search .................. 381/104, 381/107, 388
See application file for complete search history.

(56) References Cited

U.S. PATENT DOCUMENTS

| | | | |
|---|---|---|---|
| 5,930,376 A | 7/1999 | Markow et al. | |
| 2006/0061455 A1* | 3/2006 | Nousiainen | 340/407.1 |
| 2008/0137883 A1* | 6/2008 | Araki | 381/107 |

FOREIGN PATENT DOCUMENTS

| | | |
|---|---|---|
| JP | 11234778 A | 8/1999 |
| JP | 11512253 A | 10/1999 |
| JP | 11512258 A | 10/1999 |
| JP | 2002118894 A | 4/2002 |
| JP | 2002164977 A | 6/2002 |
| JP | 2004200729 A | 7/2004 |
| JP | 2005244804 A | 9/2005 |
| WO | 9531805 A | 11/1995 |
| WO | 0002417 A | 1/2000 |

OTHER PUBLICATIONS

Supplementary European Search Report for EP 06 82 3279 dated Jan. 10, 2011.

* cited by examiner

*Primary Examiner* — Roy Potter

(57) ABSTRACT

Arrangement of an internal component (not shown) arranged in the vicinity of the top side is different from that of the hinge side of an image element protective screen (2). An actuator (5) is fixed to the top side of the image element protective screen (2) and an actuator (4) is fixed to the hinge side of the image element protective screen (2). Since Arrangement of the internal component in the vicinity of the actuator is different, different sound pressure frequency characteristics or the like are experienced when each actuator is driven independently. When the actuators (4, 5) are driven simultaneously, sound pressure frequency characteristics and vibration frequency characteristics can be flattened. Isolation between the vibration speed of a vibrator near one actuator and the vibration speed of a vibrator in the region near the other actuator that are produced by respective actuators is set at 10 dB or above.

17 Claims, 15 Drawing Sheets

SPEAKER, IMAGE ELEMENT PROTECTIVE SCREEN, CASE OF TERMINAL AND TERMINAL

TECHNICAL FIELD

This invention relates to a speaker, an image element protective screen that functions as a speaker, a case of a terminal that functions as a speaker, and a terminal having a speaker, each of which is realized by providing actuators at the image element protective screen of the terminal or at the case of the terminal.

BACKGROUND ART

Japanese Unexamined Patent Application Publication (JP-A) No. 2002-164977 (paragraphs 0024-0032, 0040) (Document 1) describes an electronic device in which a driving portion (driving means) is attached to a display cover (plate-like member) disposed in front of a display for protecting the display, thereby vibrating the display cover to output a sound. Document 1 further describes that the driving means are disposed at a plurality of portions of the plate-like member, thereby enhancing the sound output.

Japanese Unexamined Patent Application Publication (JP-A) No. 2002-118894 (paragraphs 0019-0020, 0033, FIG. 14) (Document 2) describes a speaker in which linear vibrating devices are disposed at both side portions of a diaphragm and describes that, using a transparent glass, plastic, or the like as a material of the diaphragm, CRT, liquid-crystal, or other images behind the speaker can be viewed through the speaker. Further, Document 2 describes that a hybrid two-way driving system can be achieved by disposing another driving portion (piezoelectric vibrating device) in overlapping relationship to the linear vibrating device. Document 2 further describes that multiplexed audio signals of music, human voice, etc. are allocated to the respective driving portions to drive the diaphragm and that the driving signals are input with their frequency bands separated or not separated, thereby producing sounds so as to make the best use of the acoustic characteristics of the linear vibrating device and the piezoelectric vibrating device.

DISCLOSURE OF THE INVENTION

Problem to be Solved by the Invention

When realizing a speaker by vibrating a surface of a terminal itself, it is preferable that, in the sound pressure frequency characteristic indicative of a change in radiation sound pressure due to a frequency change or in the vibration frequency characteristic indicative of a change in vibration velocity of a vibrator due to a frequency change, there be no occurrence of a maximal value or a minimal value where the sound pressure frequency characteristic or the vibration frequency characteristic changes rapidly. That is, it is preferable that a change in radiation sound pressure due to a frequency change or a change in vibration velocity due to a frequency change be moderate.

Further, it is preferable that the stereophonic sound can be radiated that makes a user of a terminal feel the spatial spreading.

Therefore, it is an object of this invention to suppress a rapid change in radiation sound pressure or vibration velocity of a vibrator due to a frequency change. Further, it is an object of this invention to enable radiation of stereophonic sound that makes one feel the spatial spreading.

Means for Solving the Problem

A speaker according to a first mode of this invention is a speaker in which an image element protective screen of a terminal or a case of a terminal is provided with actuators each adapted to vibrate the image element protective screen or the case, and is characterized in that the actuators are disposed at a plurality of portions, where arrangements of components of the terminal in the vicinities thereof differ from each other, at a surface of the image element protective screen or at a surface of the case.

It is preferable that when the actuators independently vibrate the image element protective screen or the case of the terminal at disposed positions of the actuators, sound pressure frequency characteristics each indicative of a change in radiation sound pressure due to a frequency change differ from each other between the actuators.

It is preferable that when the actuators independently vibrate the image element protective screen or the case of the terminal at disposed positions of the actuators, vibration frequency characteristics each indicative of a change in vibration velocity of the image element protective screen or the case due to a frequency change differ from each other between the actuators.

It is preferable that when only one of the actuators is driven, a vibration velocity of the image element protective screen or the case close to the driven actuator and generated by the driven actuator and a vibration velocity of the image element protective screen or the case close to the other actuator not driven differ from each other by 10 dB or more.

It is preferable that when only one of the actuators is driven, a radiation sound pressure close to the driven actuator and generated by vibration of the driven actuator and a radiation sound pressure close to the other actuator not driven differ from each other by 10 dB or more.

Preferably, it is configured that when all of the actuators are driven, a radiation sound pressure increases over the whole of or in a portion of a reproduction frequency band of an audio signal as compared with a case where one of the actuators is driven.

Each of the actuators may be one of a piezoelectric actuator, an electrostatic actuator, an electromagnetic actuator, and a magnetostrictive actuator.

It may be configured that the actuators are disposed only at the surface of the image element protective screen.

It may be configured that the actuators are disposed only at the surface of the case of the terminal.

It may be configured that the actuators are disposed at both the surface of the image element protective screen and the surface of the case of the terminal.

An image element protective screen according to a second mode of this invention is an image element protective screen attached to a terminal for protecting a display device of the terminal, and is characterized in that actuators each adapted to vibrate the image element protective screen are disposed at a plurality of portions, where arrangements of components of the terminal in the vicinities thereof differ from each other, at a surface of the image element protective screen.

A case of a terminal according to a third mode of this invention is characterized in that actuators each adapted to vibrate the case are disposed at a plurality of portions, where arrangements of components of the terminal in the vicinities thereof differ from each other, at a surface of the case.

A terminal according to a third mode of this invention is characterized by comprising one of the foregoing speakers.

In this invention, actuators are disposed at a plurality of portions, where the arrangements of components of a terminal in the vicinities thereof differ from each other, at a surface of an image element protective screen or at a surface of a case. Therefore, frequency characteristics obtained when the actuators independently vibrate the image element protective screen or the case of the terminal at their respective disposed positions differ from each other. As a result, various frequency characteristics can be flattened.

When the actuators independently vibrate the image element protective screen or the case of the terminal at the disposed positions of the actuators, sound pressure frequency characteristics each indicative of a change in radiation sound pressure due to a frequency change differ from each other between the actuators. Therefore, the sound pressure frequency characteristics can be flattened by a combination of radiation sound pressures generated by independently driving the individual actuators. Further, by the combination of the radiation sound pressures, it is also possible to increase the radiation sound pressure level.

Further, when the actuators independently vibrate the image element protective screen or the case of the terminal at the disposed positions of the actuators, vibration frequency characteristics each indicative of a change in vibration velocity of the image element protective screen or the case due to a frequency change differ from each other between the actuators. Therefore, the vibration frequency characteristics can be flattened by a combination of vibration velocities generated by independently driving the individual actuators.

Further, when only one of the actuators is driven, a vibration velocity of the image element protective screen or the case close to the driven actuator and generated by the driven actuator and a vibration velocity of the image element protective screen or the case close to the other actuator not driven differ from each other by 10 dB or more. This means that vibration generated by each actuator hardly exerts any influence on a region close to the other actuator. Accordingly, it becomes possible to radiate stereophonic sound that makes one feel the spatial spreading. This also applies to the case where when only one of the actuators is driven, a radiation sound pressure close to the driven actuator and generated by vibration of the driven actuator and a radiation sound pressure close to the other actuator not driven differ from each other by 10 dB or more.

EFFECT OF THE INVENTION

According to this invention, actuators are disposed at a plurality of portions, where the arrangements of components of a terminal in the vicinities thereof differ from each other, at a surface of an image element protective screen or at a surface of a case, and therefore, it is possible to flatten sound pressure frequency characteristics or vibration frequency characteristics. That is, it is possible to suppress a rapid change in radiation sound pressure due to a frequency change or a rapid change in vibration velocity due to a frequency change.

Further, according to this invention, in the case where when only one of the actuators is driven, a vibration velocity of the image element protective screen or the case close to the driven actuator and generated by the driven actuator and a vibration velocity of the image element protective screen or the case close to the other actuator not driven differ from each other by 10 dB or more, it is possible to radiate stereophonic sound that makes one feel the spatial spreading. Likewise, in the case where when only one of the actuators is driven, a radiation sound pressure close to the driven actuator and generated by vibration of the driven actuator and a radiation sound pressure close to the other actuator not driven differ from each other by 10 dB or more, it is also possible to radiate stereophonic sound that makes one feel the spatial spreading.

BEST MODE FOR CARRYING OUT THE INVENTION

Hereinbelow, embodiments of this invention will be described with reference to the drawings.

Figure 1:
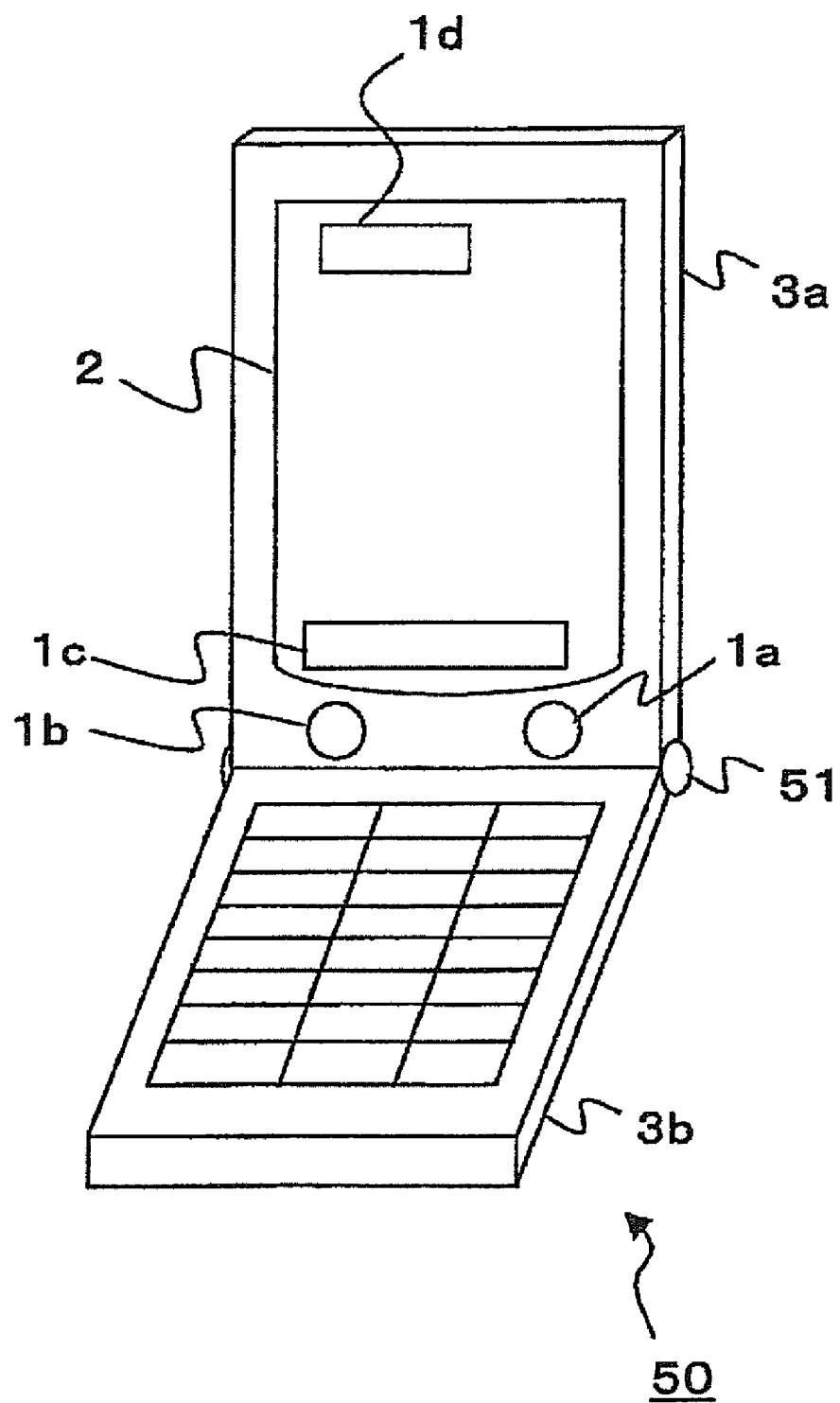
FIG. 1 is an explanatory diagram showing a structural example of this invention.

FIG. 1 is an explanatory diagram showing a structural example of this invention. A terminal 50 comprises a case 3a and an image element protective screen 2. The following description will be given assuming that the terminal 50 is a portable telephone, but the terminal 50 is not limited to the portable telephone and may be another terminal such as a PDA (Personal Digital Assistant). The image element protective screen 2 is a transparent plate-like member disposed in front of a display device (not shown) of the portable telephone 50 and serves to protect the display device. As the image element protective screen 2, use is made, for example, of an acrylic board or the like having a thickness of about 1 mm.

The example shown in FIG. 1 is configured such that the terminal 50 has a case 3b different from the case 3a and a hinge 51 and the cases 3a and 3b are connected to each other by the hinge 51 so as to be openable/closable (foldable). The case 3a (hereinafter referred to as the first case 3a) is provided with the image element protective screen 2. Hereinafter, the other case different from the first case 3a will be referred to as the second case.

Further, the portable telephone 50 comprises actuators 1a to 1d. The actuators, in response to an audio signal, vibrate the members provided with the actuators themselves to thereby produce sounds. FIG. 1 shows the case where the first case 3a has the actuators 1a and 1b disposed thereon and the image element protective screen 2 has the actuators 1c and 1d disposed thereon. The actuators 1a to 1d are respectively disposed at a plurality of portions, where the arrangements of components of the terminal in the vicinities thereof differ from each other, on a surface of the image element protective screen 2 and a surface of the first case 3a. For example, in the example of FIG. 1, the arrangements of components (not shown) inside the portable telephone 50 are asymmetrical with each other in the left-right direction. Since the actuators 1a and 1b are disposed on the left and right sides of the portable telephone 50, the arrangements of the internal components of the portable telephone 50 present in the vicinities of the actuators 1a and 1b differ from each other. Similarly, the arrangements of the internal components of the portable telephone 50 present in the vicinities of the actuators 1c and 1d disposed to be aligned in the length direction also differ from each other. In this manner, the arrangements of the internal components of the portable telephone 50 present in the vicinities of the respective actuators 1a to 1d differ from each other.

FIG. 1 shows the case where the portable telephone 50 has a plurality of actuators with different specifications. For example, the actuators 1a and 1b, the actuator 1c, and the actuator 1d differ in size and shape. However, a plurality of actuators of the portable telephone 50 may be actuators with the same specification or actuators with the same characteristics. Alternatively, at least one actuator may differ in specification or characteristics from the other actuators. Alternatively, all the actuators of the portable telephone 50 may differ in specification or characteristics from each other. Herein, the specification being the same represents that actuators are the same in item number or type, while, the specification being different represents that actuators differ in item number or type. Further, the characteristics being the same as referred to herein represents that when the characteristics of respective actuators are measured under the same conditions, the measured characteristics are the same as each other, while, the characteristics being different as referred to herein represents that when the characteristics of respective actuators are measured under the same conditions, the measured characteristics differ from each other.

As a characteristic of an actuator, there is cited a sound pressure frequency characteristic indicative of a change in radiation sound pressure (in other words, particle velocity of air molecules on a surface radiating a sound) due to a frequency change or a vibration frequency characteristic indicative of a change in vibration velocity of a vibrator (in this embodiment, the case or the image element protective screen provided with the actuator) due to a frequency change. The particle velocity of air molecules represents a velocity of only acoustic compression wave components, not including those components due to thermal motion of the air molecules.

Although FIG. 1 shows the case where the portable telephone 50 has four actuators, it is sufficient that the portable telephone 50 has a plurality of actuators. For example, the number of actuators may be two, three, or five or more.

Further, actuators may be disposed only on the surface of the image element protective screen 2 or only on the surface of the first case 3a. As shown in FIG. 1, actuators may be disposed on both the surface of the image element protective screen 2 and the surface of the first case 3a.

Further, actuators may be attached on the inner side of the portable telephone 50 or on the outer side of the portable telephone 50. That is, actuators to be provided at the image element protective screen 2 may be disposed on the surface on either side of the image element protective screen 2. Likewise, actuators to be provided at the first case 3a may be disposed on the surface facing the outside of the first case 3a or may be disposed on the surface on the inner side of the first case 3a.

When a plurality of actuators are simultaneously driven, the vibration velocity at each point of the image element protective screen 2 and the first case 3a becomes a combination of vibration velocities generated by separately driving the individual actuators. Therefore, the particle velocity of air molecules on a surface radiating a sound also becomes a combination of particle velocities generated by separately driving the individual actuators and, if the surface radiating the sound is not large relative to a wavelength of the vibration, the radiation sound pressure also becomes a combination of radiation sound pressures generated by separately driving the individual actuators.

As already described, the actuators 1a to 1d are respectively disposed at the plurality of portions, where the arrangements of the components of the terminal in the vicinities thereof differ from each other, on the surface of the image element protective screen 2 and the surface of the first case 3a. Therefore, the sound pressure frequency characteristics or the vibration frequency characteristics obtained by independently driving the individual actuators at their respective disposed positions differ from each other among the individual actuators. That is, changes in radiation sound pressure or in vibration velocity of a vibrator due to a frequency change differ from each other among the actuators disposed at the respective positions.

Even if the actuators 1a to 1d are actuators with the same specification or even if the characteristics of the actuators 1a to 1d under the same conditions are the same as each other, the same characteristics are not exhibited because the arrangements of the components in the vicinities of the disposed positions differ from each other. That is, even if the respective actuators have the same specification or characteristics (characteristics measured under the same conditions), since the arrangements of the components in the vicinities of the disposed positions of the respective actuators differ from each other, the actuators disposed at the respective positions exhibit mutually different sound pressure frequency characteristics or mutually different vibration frequency characteristics.

Even if the radiation sound pressure takes maximal or minimal values in the sound pressure frequency characteristics obtained by independently driving the individual actuators at their respective disposed positions, when the actuators 1a to 1d are simultaneously driven, the radiation sound pressures generated by separately driving the individual actuators are combined together. As a result, a flatter sound pressure frequency characteristic is realized over the entire surface radiating a sound. That is, a change in radiation sound pressure due to a frequency change becomes moderate. Specifically, when the radiation sound pressures (particle velocities of air molecules) at the same frequency differ from each other by 3 dB or more, the radiation sound pressure at that frequency becomes, due to a combination of the radiation sound pressures, slightly higher than the highest radiation sound pressure in the radiation sound pressures generated by the individual actuators. Therefore, even if there is a case where maximal or minimal values occur in the sound pressure frequency characteristics by the actuators at their respective disposed positions, the radiation sound pressure, in the sound pressure frequency characteristic obtained by vibrating the vibrator with the actuators 1a to 1d to produce a sound, changes due to frequency changes so as to trace radiation sound pressures slightly higher than the highest radiation sound pressures at respective frequencies in the respective sound pressure frequency characteristics obtained by respectively driving only the individual actuators. As a result, in the sound pressure frequency characteristic obtained by vibrating the vibrator with the actuators 1a to 1d to produce a sound, a change in radiation sound pressure due to a frequency change becomes moderate. In this manner, if there is a frequency at which the difference between a radiation sound pressure by one actuator and a radiation sound pressure by any other actuator is 3 dB or more, a radiation sound pressure slightly higher than the higher radiation sound pressure is obtained around such a frequency, so that it is possible to prevent a rapid change in radiation sound pressure due to a frequency change. In the case where the difference between radiation sound pressures at the same frequency is less than 3 dB, it can be said that the radiation sound pressures of the respective actuators are more or less the same, but in this case, there is obtained an effect that the radiation sound pressure increases by a combination of the radiation sound pressures.

This also applies to the vibration frequency characteristics. That is, even if the vibration velocity of the vibrator takes maximal or minimal values in the vibration frequency characteristics obtained by independently driving the individual actuators at their respective disposed positions, when the actuators 1a to 1d are simultaneously driven, the vibration velocities generated by separately driving the individual actuators are combined together at each point of the vibrator. As a result, a change in vibration velocity of the vibrator due to a frequency change becomes moderate, so that a flatter vibration frequency characteristic is realized. Specifically, when the vibration velocities at the same frequency differ from each other by 3 dB or more, the vibration velocity at that frequency becomes, due to a combination of the vibration velocities, slightly higher than the highest vibration velocity in the vibration velocities generated by the individual actuators. Therefore, even if there is a case where maximal or minimal values occur in the vibration frequency characteristics by the actuators at their respective disposed positions, the vibration velocity, in the vibration frequency characteristic obtained by vibrating the vibrator with the actuators 1a to 1d to produce a sound, changes due to frequency changes so as to trace vibration velocities slightly higher than the highest vibration velocities at respective frequencies in the respective vibration frequency characteristics obtained by respectively driving only the individual actuators. As a result, in the vibration frequency characteristic obtained by vibrating the vibrator with the actuators 1a to 1d to produce a sound, a change in vibration velocity due to a frequency change becomes moderate. In this manner, if there is a frequency at which the difference between a vibration velocity by one actuator and a vibration velocity by any other actuator is 3 dB or more, a vibration velocity slightly higher than the higher vibration velocity is obtained around such a frequency, so that it is possible to prevent a rapid change in vibration velocity due to a frequency change.

Measurement of the sound pressure frequency characteristics or the vibration frequency characteristics (measurement of the radiation sound pressures or the vibration velocities of the vibrator) obtained by independently driving the individual actuators at their respective disposed positions is carried out at a common position. For example, when measuring the sound pressure frequency characteristics obtained by independently driving the individual actuators at their respective disposed positions, the measurement is carried out by placing a microphone at the common position. To give a specific example, in the case where actuators 4 and 5 shown in FIG. 2 (FIG. 2 will be described later) are disposed on the hinge side and the top side of an image element protective screen 2, respectively, the sound pressure frequency characteristic is measured per actuator by disposing a microphone at the center portion of the image element protective screen 2. In this event, if there is a frequency at which there occurs a difference in radiation sound pressure of 3 dB or more, a change in radiation sound pressure due to a frequency change becomes moderate when the actuators 4 and 5 are simultaneously driven.

As described above, if there is a frequency at which the difference between a radiation sound pressure by one actuator and a radiation sound pressure by any other actuator is 3 dB or more, it is possible to suppress a rapid change in radiation sound pressure due to a frequency change around such a frequency. As the difference in radiation sound pressure at the same frequency increases, the effect of flattening of the sound pressure frequency characteristics by a combination of radiation sound pressures increases. Further, if there is a frequency at which the difference between a vibration velocity by one actuator and a vibration velocity by any other actuator is 3 dB or more, it is possible to suppress a rapid change in vibration velocity due to a frequency change around such a frequency. As the difference in vibration velocity at the same frequency increases, the effect of flattening of the vibration frequency characteristics by a combination of vibration velocities increases.

Generally, the vibration frequency characteristic and the sound pressure frequency characteristic are in a corresponding relationship. Therefore, if there is a frequency at which the difference between a vibration velocity by one actuator and a vibration velocity by any other actuator is 3 dB or more, it is general that the difference between a radiation sound pressure by one actuator and a radiation sound pressure by any other actuator also becomes 3 dB or more at that frequency.

When the vibration frequency characteristics obtained by independently driving the individual actuators at their respective disposed positions are compared with each other, the difference in vibration velocity between the actuators decreases at frequencies of 3 kHz and higher. Likewise, when the sound pressure frequency characteristics obtained by independently driving the individual actuators at their respective disposed positions are compared with each other, the difference in radiation sound pressure between the actuators decreases at frequencies of 3 kHz and higher. Accordingly, the effect of flattening of the vibration frequency characteristics or the sound pressure frequency characteristics is mainly obtained in the range of frequencies smaller than 3 kHz. Further, even in the case of independently driving the individual actuators at their respective disposed positions, dips (minimal values) are relatively small in number at frequencies of 3 kHz and higher and, therefore, the flattening is not so required from the first. Accordingly, it is sufficient that the effect of flattening of the vibration frequency characteristics or the sound pressure frequency characteristics is obtained in the range of frequencies smaller than 3 kHz.

Incidentally, the effect that the radiation sound pressure increases by a combination of radiation sound pressures is relatively small at frequencies of 3 kHz and higher. However, even in the case of independently driving the individual actuators at their respective disposed positions, since radiation sound pressures at sufficient levels are obtained at frequencies of 3 kHz and higher from the first, no particular problem arises.

Although the description has been given that dips are small in number at frequencies of 3 kHz and higher when the individual actuators are independently driven at their respective disposed positions, if the case occurs where a rapid maximal value of the radiation sound pressure or the vibration velocity of the vibrator cannot be suppressed by the combination, signal processing may be performed at a frequency with the maximal value so as to lower the level of the radiation sound pressure or the vibration velocity of the vibrator.

It is possible to radiate stereophonic sound by disposing a plurality of actuators so as to satisfy the predetermined conditions. These predetermined conditions will be described later. Radiation of stereophonic sound by a plurality of actuators may also be referred to as multichannel audio reproduction.

Figure 2:
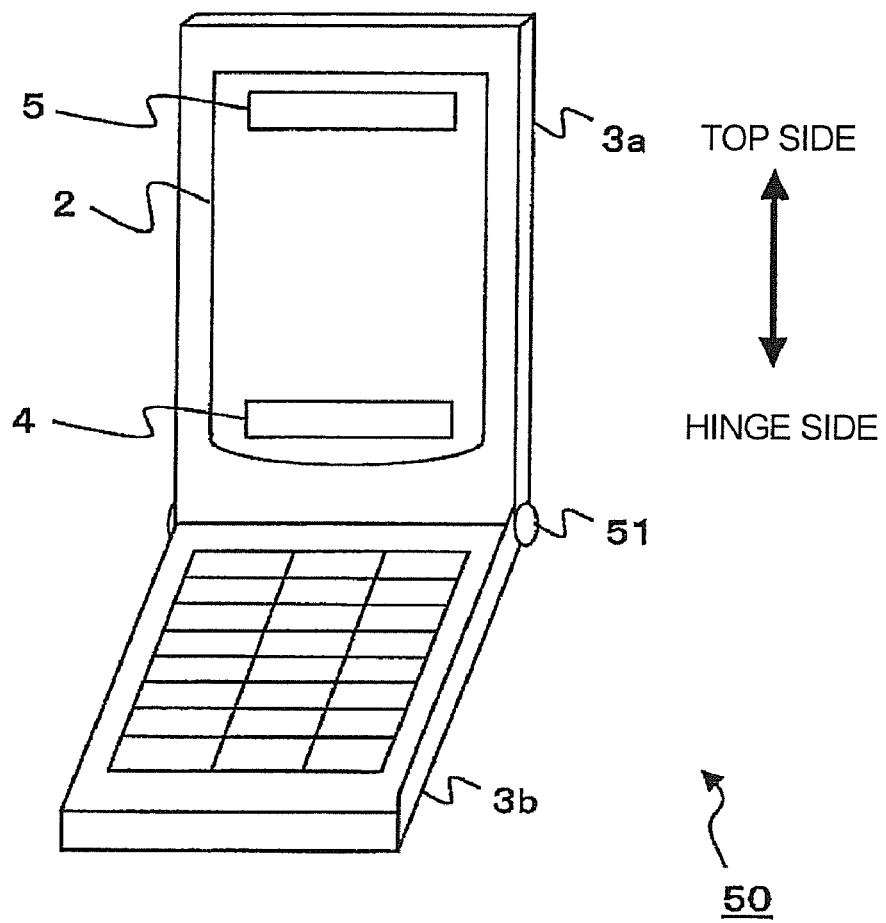
FIG. 2 is an explanatory diagram showing a structural example of a portable telephone in which an image element protective screen is provided with two actuators having the same characteristics.

Next, this invention will be described assuming that an image element protective screen of a portable telephone is provided with two actuators having the same characteristics (actuators whose characteristics become the same under the same conditions). FIG. 2 is an explanatory diagram showing a structural example of a portable telephone in which an image element protective screen is provided with two actuators having the same characteristics. The same structural portions as those shown in FIG. 1 are assigned the same symbols as those in FIG. 1, thereby omitting detailed explanation thereof. In the structure shown in FIG. 2, an image element protective screen 2 is attached to a first case 3a of a portable telephone 50. The portable telephone 50 is configured to be openable/closable (foldable) by means of a hinge 51. That is, the first case 3a and a second case 3b are connected to each other by the hinge 51 so as to be openable/closable. However, the first case 3a and the second case 3b may be configured to be connected to each other by a member other than the hinge. In the image element protective screen 2 or the first case 3a, a portion close to the hinge 51 will be referred to as the hinge side, while, a portion remote from the hinge 51 will be referred to as the top side. An actuator 4 is attached to the image element protective screen 2 on the hinge side. An actuator 5 that exhibits the same characteristics as the actuator 4 under the same conditions is attached to the image element protective screen 2 on the top side.

The actuators 4 and 5 are each an actuator using, for example, any of piezoelectric transduction, electrostatic transduction, electromagnetic conversion, and magnetostrictive transduction. That is, the actuator 4, 5 is, for example, any of a piezoelectric actuator, an electrostatic actuator, an electromagnetic actuator, and a magnetostrictive actuator. Particularly, since the piezoelectric actuator (piezoelectric element) exhibits a large vibration force and thus can be reduced in size, it is preferable to use the piezoelectric actuator (piezoelectric element) as the actuator 4, 5. In the case of using a piezoelectric element as an actuator, a piezoelectric plate can be directly bonded to a vibrator and therefore the actuator can be reduced in thickness. Further, when using any type of actuators, there is no particular limitation to the mechanical structure and shape of the actuators 4 and 5. Further, as already described, the actuators 4 and 5 may be attached to the surface on either side of the image element protective screen 2 in the form of a plate-like member. Further, there is no particular limitation to a method of attaching the actuators 4 and 5 to the image element protective screen 2.

Figure 3:
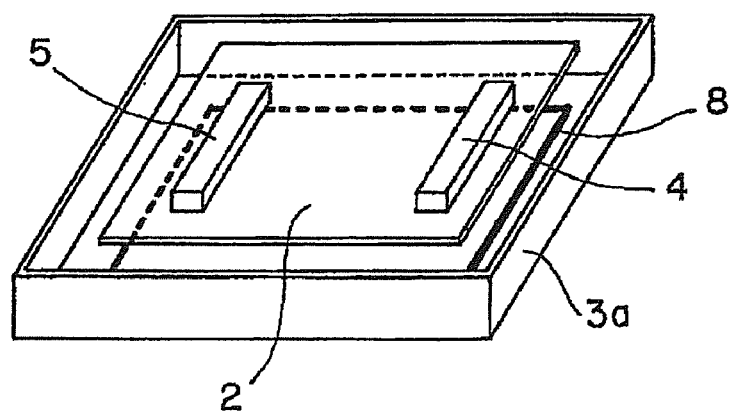
FIG. 3 is an explanatory diagram showing an example of mounting of the image element protective screen with respect to a first case of the portable telephone.

FIG. 3 is an explanatory diagram showing an example of mounting of the image element protective screen 2 with respect to the first case 3a of the portable telephone 50. FIG. 3 shows the case where the image element protective screen 2 and so on are observed from the inner side of the first case 3a. Further, FIG. 3 shows the state where the image element protective screen 2 is separated from the first case 3a. The first case 3a is formed with an opening for attaching the image element protective screen 2 and a cushion member (elastic body) 8 is provided on the edge of the opening.

The two actuators 4 and 5 are fixed to the image element protective screen 2. Then, the image element protective screen 2 is attached to the first case 3a through the cushion member 8 and fixed thereto. However, on the top side and the hinge (not shown in FIG. 3) side of the image element protective screen 2, the arrangements of internal components (not shown) disposed in the vicinities thereof differ from each other. That is, the arrangements of the internal components in the vicinities of the actuator 5 on the top side and the actuator 4 on the hinge side differ from each other.

As the image element protective screen 2, use is made, for example, of a plate-like member such as an acrylic board having a high mechanical hardness. Then, the damping characteristic of the image element protective screen 2 becomes small and the Q value of mechanical vibration becomes high. This is not preferable for flattening of the sound pressure frequency characteristics or the vibration frequency characteristics. Therefore, the cushion member 8 is provided on the edge of the opening of the first case 3a and the image element protective screen 2 is attached to the first case 3a through the cushion member 8, thereby facilitating damping of vibration of the vibrator (the image element protective screen 2 in the example shown in FIG. 2).

As already described, in terms of the vibration force being large and in terms of the capability of size reduction, it is preferable to use the piezoelectric actuator (piezoelectric element) as each of the actuators 4 and 5. However, the piezoelectric element exhibits a high Q value of mechanical vibration. Accordingly, in the case of using the piezoelectric actuator (piezoelectric element) as the actuator 4, 5, it is preferable to attach the actuator 4, 5 to the image element protective screen 2 through a cushion member for reducing the high Q value.

Figure 4:
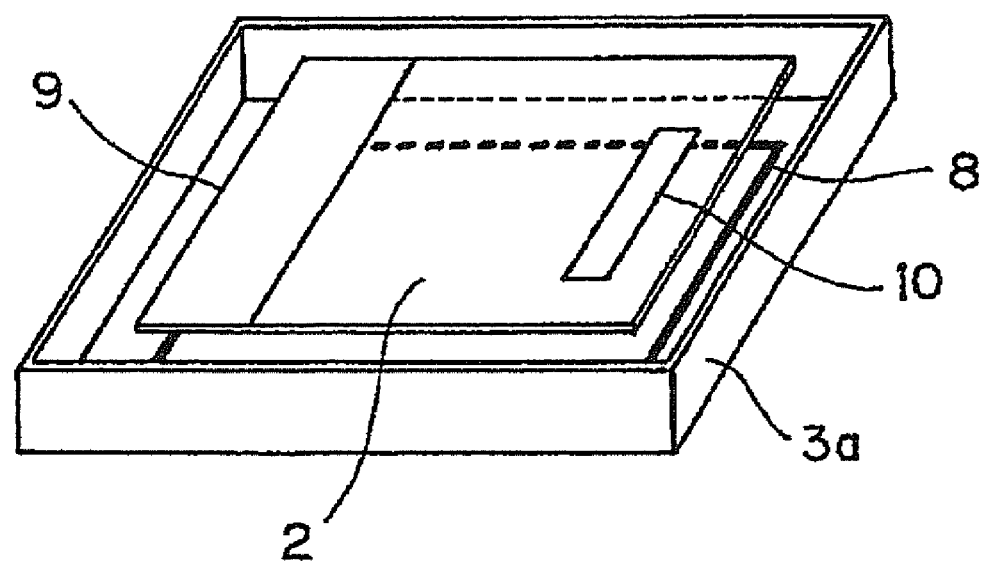
FIG. 4 is an explanatory diagram showing a mounting example in which thin-type actuators are used as actuators.

FIG. 4 is an explanatory diagram showing a mounting example in which thin-type actuators are used as actuators. The same structural portions as those shown in FIG. 3 are assigned the same symbols as those in FIG. 3, thereby omitting explanation thereof. A description of FIG. 4 will be given assuming that the actuators are thin-type piezoelectric elements. In the example shown in FIG. 4, two thin-type actuators (piezoelectric elements) 9 and 10 differ in specification and size from each other. When bonding the piezoelectric element to the image element protective screen 2, the piezoelectric element may be bonded by applying an adhesive to only a portion of its surface on the side of the image element protective screen 2. Alternatively, the piezoelectric element may be bonded by applying an adhesive to its entire surface on the side of the image element protective screen 2. This also applies to the case where a cushion member is disposed between the piezoelectric element and the image element protective screen 2.

On the other hand, the thin-type piezoelectric element may be embedded in the image element protective screen 2, thereby integrating the image element protective screen 2 and the piezoelectric element with each other. For example, a recess may be formed on the image element protective screen 2 and the piezoelectric element may be disposed in the recess and covered with a rubber (elastic body) or the like, thereby integrating the image element protective screen 2 and the piezoelectric element with each other.

Because of the difference in arrangement of components in the vicinities of the actuators, the characteristics by the individual actuators at their respective disposed positions differ from each other. Further, by changing a manner of attachment to the vibrator per actuator (e.g. by changing the adhesive application area per actuator or by changing per actuator whether or not to embed the actuator in the vibrator), the difference in characteristics by the actuators at their respective disposed positions further increases.

For example, with respect to the actuator 5 on the top side and the actuator 4 on the hinge side shown in FIG. 3, the arrangements of the internal components in the vicinities thereof differ from each other. Therefore, even if the actuators 4 and 5 have the same characteristics, different sound pressure frequency characteristics or different vibration frequency characteristics are exhibited due to the difference in arrangement of the components in the vicinities thereof. Further, as described above, if the attaching manners of the actuators 4 and 5 are made different from each other by changing the adhesive application area per actuator 4, 5 or by bonding one of them and embedding the other in the image element protective screen 2, the difference in sound pressure frequency characteristics or vibration frequency characteristics by the actuators 4 and 5 at their respective disposed positions can be further increased.

Figure 5:
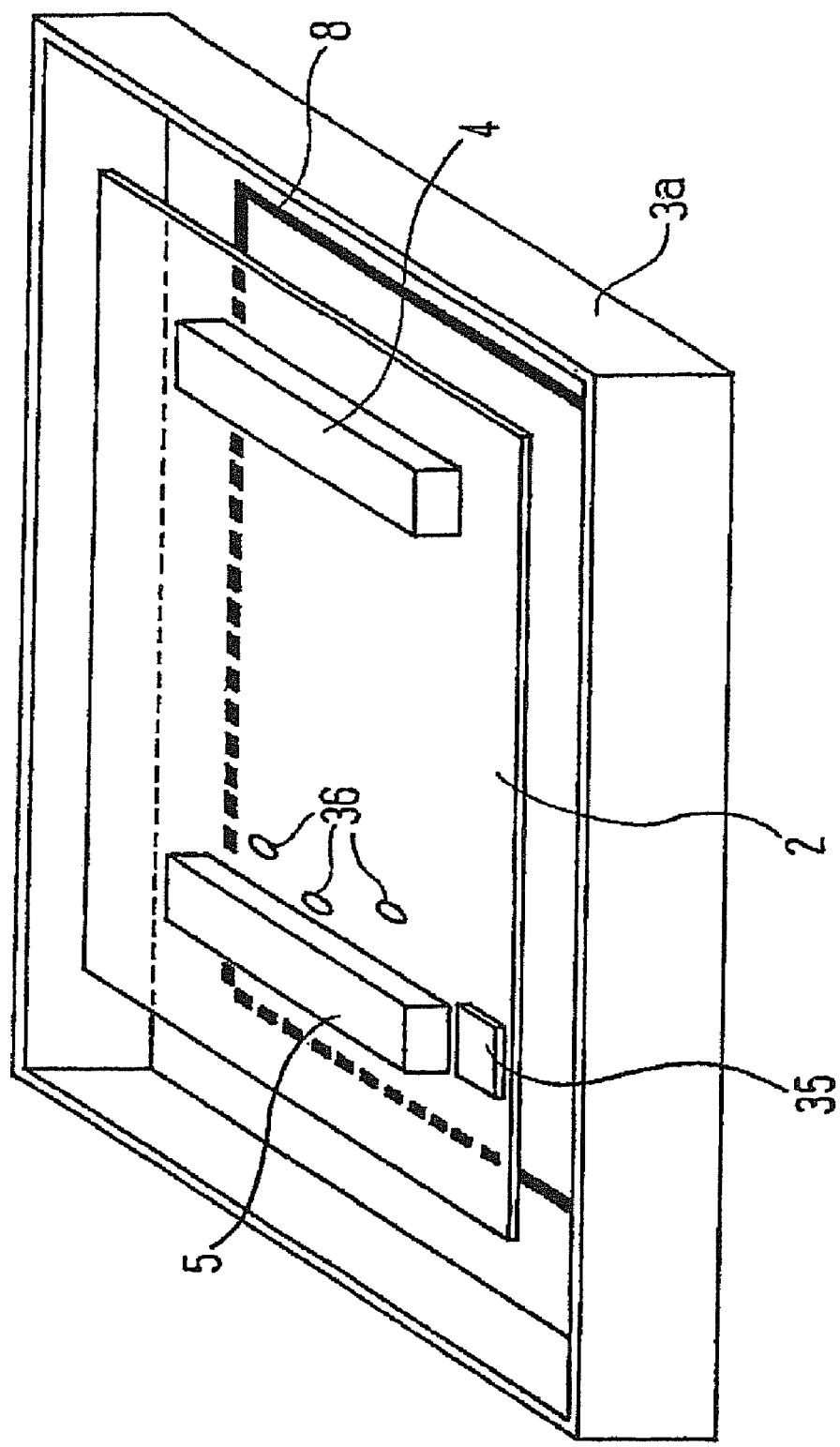
FIG. 5 is an explanatory diagram showing an example in which the states of a vibrator in the vicinities of individual actuators are changed per actuator.

Further, by changing, per actuator, the states of a vibrator in the vicinities of individual actuators, it is also possible to increase the difference in sound pressure frequency characteristics or vibration frequency characteristics by the actuators at their respective disposed positions. FIG. 5 is an explanatory diagram showing an example in which the states of a vibrator in the vicinities of individual actuators are changed per actuator. The same structural portions as those shown in FIG. 3 are assigned the same symbols as those in FIG. 3, thereby omitting explanation thereof. In the example shown in FIG. 5, an image element protective screen 2 is formed with holes 36 in the vicinity of an actuator 5 on the top side. Further, in the vicinity of the actuator 5 on the top side, a weight 35 is attached to the image element protective screen 2. On the other hand, no hole or weight is provided in the vicinity of the actuator 4 on the hinge side. As shown in FIG. 5, by providing the difference between the actuators as to whether or not to provide the holes 36 or the weight 35, it is possible to further increase the difference in sound pressure frequency characteristics or vibration frequency characteristics by the actuators 4 and 5 at their respective disposed positions.

FIG. 5 shows the case where the holes 36 and the weight 35 are both provided in the vicinity of one of the actuators, i.e. the actuator 5. However, the difference in sound pressure frequency characteristics or vibration frequency characteristics by the actuators 4 and 5 at their respective disposed positions may be increased only by the difference in presence of the holes 36. Further, the difference in sound pressure frequency characteristics or vibration frequency characteristics by the actuators 4 and 5 at their respective disposed positions may be increased only by the difference in presence of the weight 35.

FIG. 5 shows the case where the image element protective screen 2 is formed with the holes and attached with the weight. However, in the case where actuators are disposed on a surface of a case, the case may be formed with holes or attached with a weight.

As already described, as the difference in radiation sound pressure at the same frequency increases, the effect of flattening of the sound pressure frequency characteristics by a combination of radiation sound pressures increases. Likewise, as the difference in vibration velocity at the same frequency increases, the effect of flattening of the vibration frequency characteristics by a combination of vibration velocities increases. Therefore, the effect of flattening of the sound pressure frequency characteristics or the vibration frequency characteristics can be enhanced by changing an actuator attaching manner per actuator or by changing, per actuator, the states of the vibrator in the vicinities of the individual actuators. Further, the above effect can also be increased by changing the actuator thickness per actuator.

The actuators are disposed at positions where the arrangements of internal components in the vicinities thereof differ from each other. In this event, adjustment may be performed by measuring the characteristics by the actuators at their respective positions to find out those actuator disposing positions that can provide a larger difference in sound pressure frequency characteristics or vibration frequency characteristics, and disposing the actuators at those positions.

As already described, the difference in sound pressure frequency characteristics or vibration frequency characteristics between the actuators decreases in the range of frequencies of 3 kHz and higher. Even by changing an actuator attaching manner per actuator or by changing, per actuator, the states of the vibrator in the vicinities of the individual actuators, the influence on the sound pressure frequency characteristics or the vibration frequency characteristics is small in the range of 3 kHz and higher. Therefore, even in the case where the attaching manner or the like is changed per actuator, the effect of flattening of the vibration frequency characteristics or the sound pressure frequency characteristics is mainly obtained in the range of frequencies smaller than 3 kHz.

Figure 6:
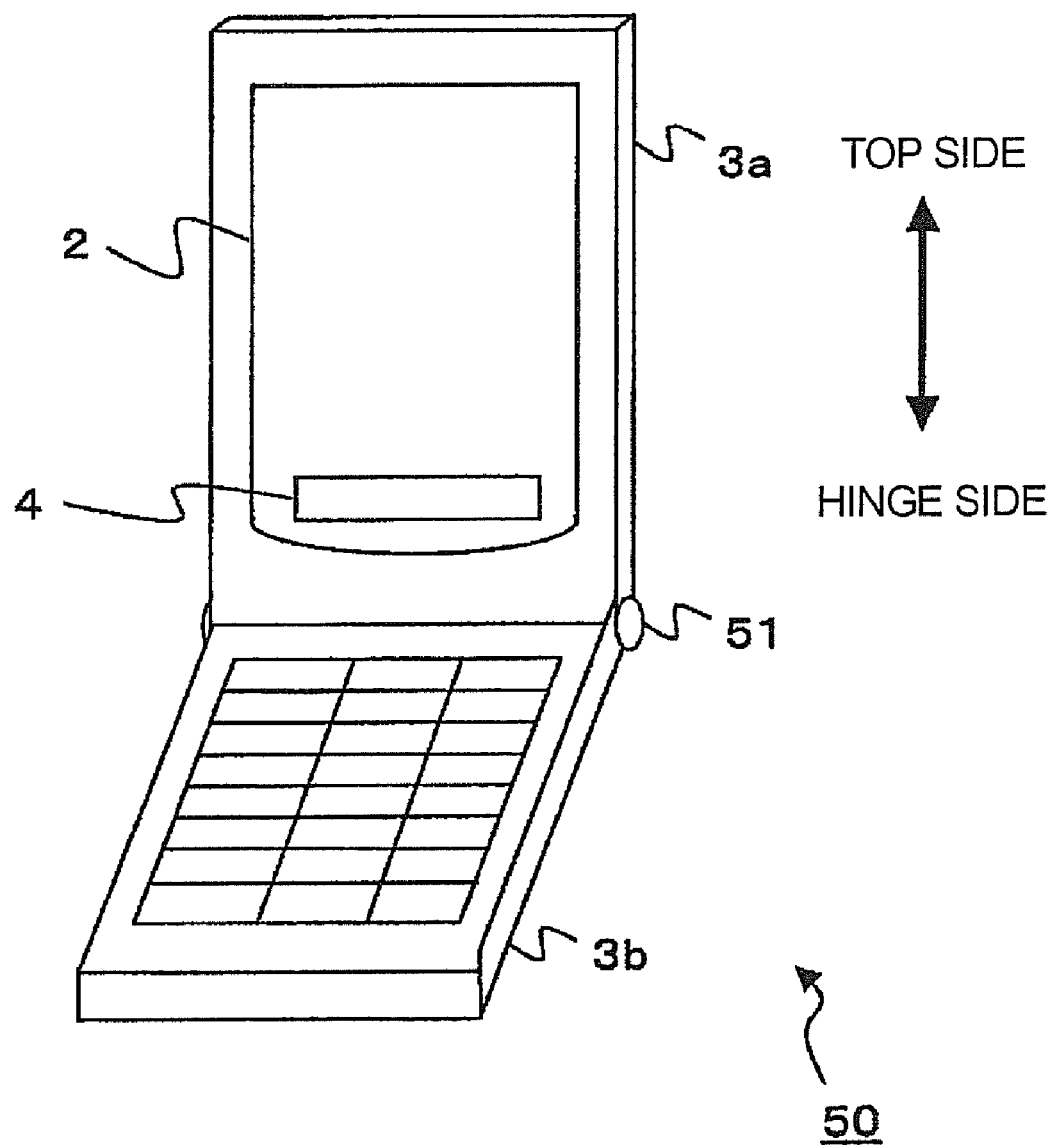
FIG. 6 is an explanatory diagram showing a structural example of a portable telephone in which an actuator is attached to an image element protective screen only on the hinge side.
Figure 7:
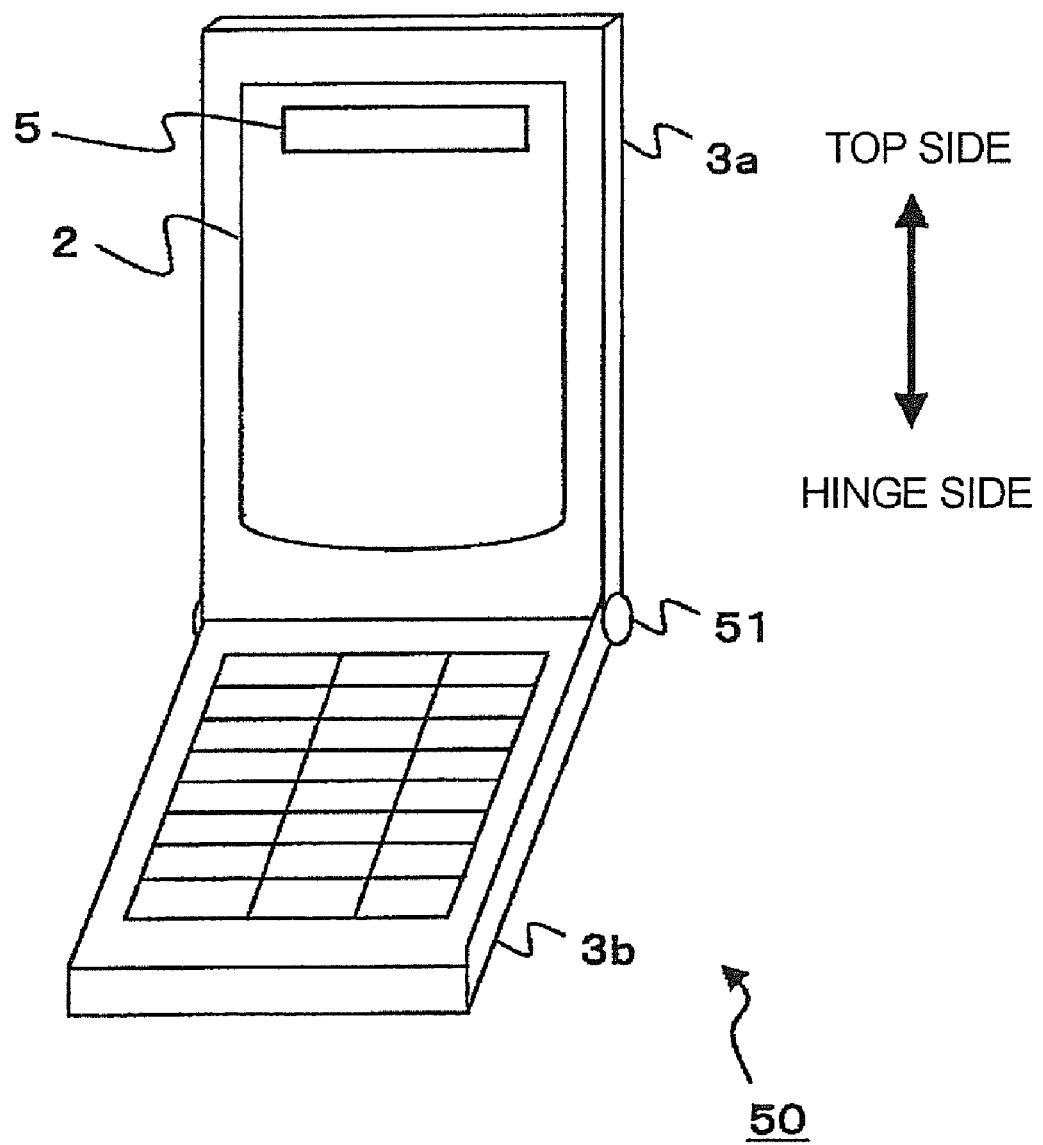
FIG. 7 is an explanatory diagram showing a structural example of a portable telephone in which an actuator is attached to an image element protective screen only on the top side.

Next, a description will be given of the sound pressure frequency characteristics when the two actuators 4 and 5 shown in FIG. 2 vibrate the image element protective screen 2 to produce a sound. At first, there are shown the sound pressure frequency characteristics by the individual actuators disposed on the top side and the hinge side. FIG. 6 shows a structural example of a portable telephone in which an actuator is attached to an image element protective screen only on the hinge side. FIG. 7 shows a structural example of a portable telephone in which an actuator is attached to an image element protective screen only on the top side. In FIGS. 6 and 7, the same structural portions as those in FIG. 2 are assigned the same symbols as those in FIG. 2.

An actuator 4 disposed on the hinge side as shown in FIG. 6 and an actuator 5 disposed on the top side as shown in FIG. 7 are actuators that exhibit the same characteristics under the same conditions. However, since the arrangements of internal components (not shown) differ from each other on the top side and the hinge side, the states of vibration due to excitation of the actuators significantly change per actuator. As a result, even with the actuators that exhibit the same characteristics under the same conditions, the sound pressure frequency characteristics differ from each other depending on the disposed positions.

Figure 8:
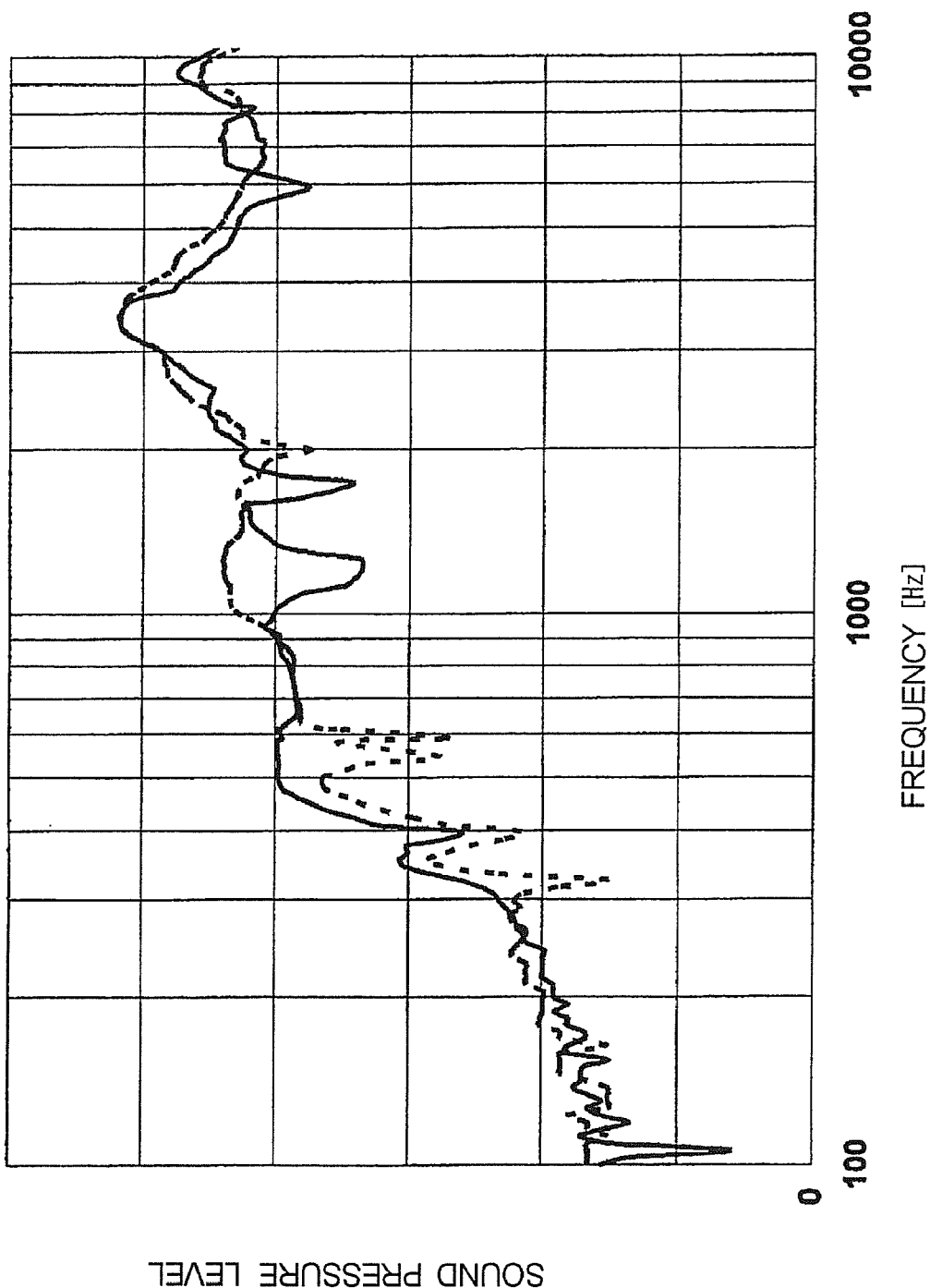
FIG. 8 is a characteristic diagram showing the sound pressure frequency characteristics by individual actuators.

FIG. 8 shows the sound pressure frequency characteristics by the individual actuators 4 and 5 shown in FIGS. 6 and 7, respectively. In FIG. 8, the axis of abscissas represents frequency (unit is Hz) and the axis of ordinates represents radiation sound pressure (unit is dB SPL). The scale of the axis of ordinates is 20 dB/div (the same applies to later-described FIG. 9). The sound pressure frequency characteristic shown by a solid line in FIG. 8 is a sound pressure frequency characteristic obtained when the actuator 4 is disposed only on the hinge side (see FIG. 6). On the other hand, the sound pressure frequency characteristic shown by a broken line in FIG. 8 is a sound pressure frequency characteristic obtained when the actuator 5 is disposed only on the top side (see FIG. 7). The two sound pressure frequency characteristics shown in FIG. 8 are each the results of measurement performed by disposing a microphone at the center portion of the image element protective screen 2. In the portable telephones 50 used to measure the sound pressure frequency characteristics shown in FIG. 8, the actuators 4 and 5 are attached in the same manner and no hole 36 or weight 35 (see FIG. 5) are provided.

Even with the actuators that exhibit the same characteristics under the same conditions, the sound pressure frequency characteristics differ from each other depending on the disposed positions as shown in FIG. 8. Further, as shown in FIG. 8, in each of the sound pressure frequency characteristics by the individual actuators, there are portions where the radiation sound pressure rapidly changes due to frequency changes to take maximal or minimal values. Among those frequencies, there are frequencies at which the difference in radiation sound pressure is 3 dB or more.

Figure 9:
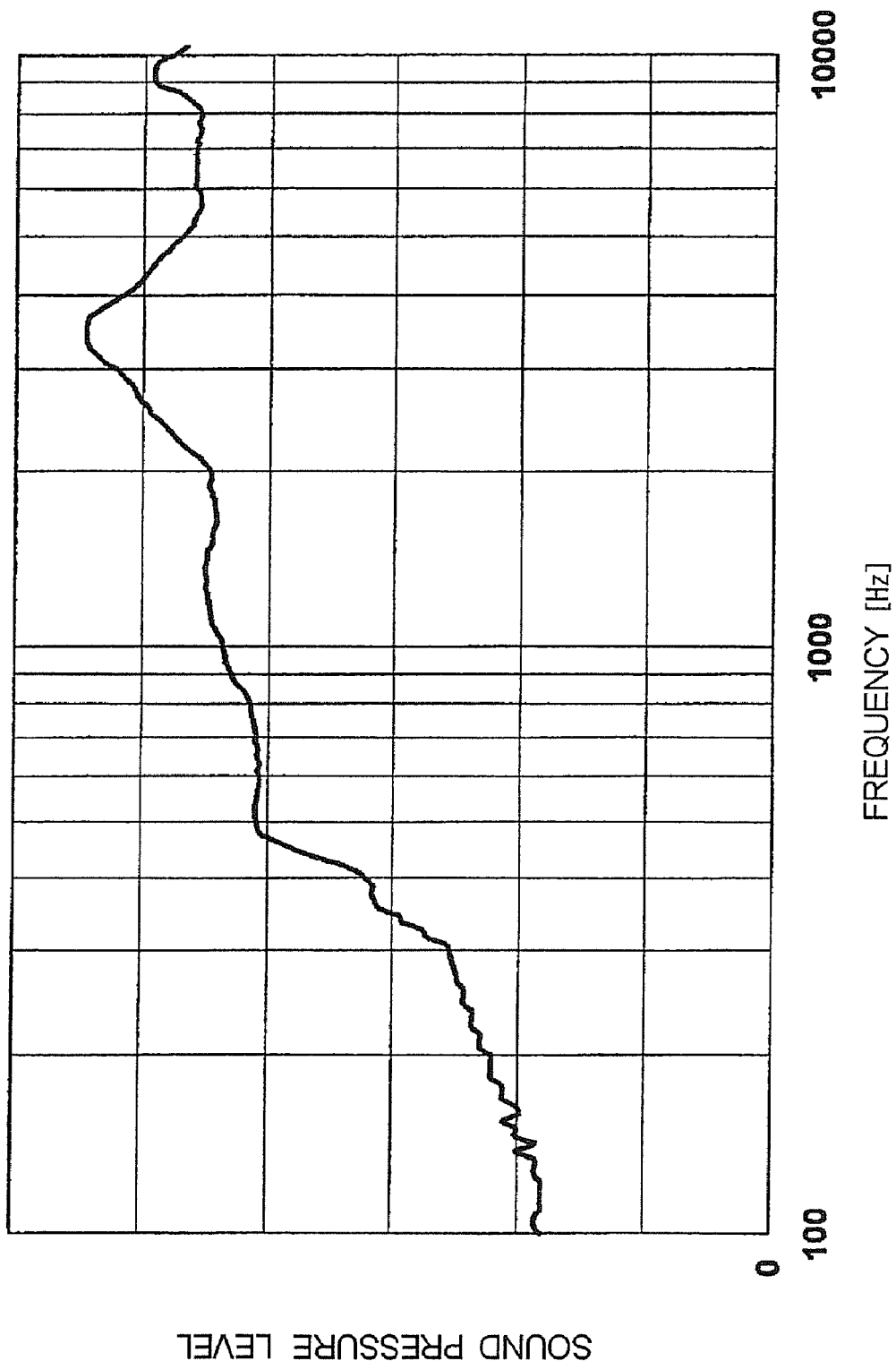
FIG. 9 is a characteristic diagram showing the sound pressure frequency characteristic obtained when actuators are disposed on the top side and the hinge side of an image element protective screen, respectively.

As in the structure shown in FIG. 2, when the actuator 5 is disposed on the top side of the image element protective screen 2 and the actuator 4 is disposed on the hinge side thereof, the radiation sound pressure generated by the two actuators 4 and 5 becomes a combination of a radiation sound pressure generated using only the actuator 4 and a radiation sound pressure generated using only the actuator 5. Accordingly, the sound pressure frequency characteristic in the case of the structure shown in FIG. 2 becomes, per frequency, approximately a combination of a radiation sound pressure in the case of the structure shown in FIG. 6 and a radiation sound pressure in the case of the structure shown in FIG. 7. That is, the radiation sound pressure changes due to frequency changes so as to trace radiation sound pressures slightly higher than higher radiation sound pressures in radiation sound pressures at respective frequencies. Therefore, when the actuators 4 and 5 shown in FIG. 2 are simultaneously driven, changes in radiation sound pressure become moderate. FIG. 9 shows the sound pressure frequency characteristic obtained when the actuator 5 is disposed on the top side of the image element protective screen 2 and the actuator 4 is disposed on the hinge side thereof (see FIG. 2). As shown in FIG. 9, the sound pressure frequency characteristic of a sound radiated from the image element protective screen 2 can be moderated by disposing the actuators 4 and 5 and vibrating the image element protective screen 2 using the two actuators 4 and 5. That is, it is possible to prevent a rapid change in radiation sound pressure due to a frequency change.

To give a detailed explanation, it is seen that, in the sound pressure frequency characteristic (characteristic shown by a broken line in FIG. 8) obtained when the actuator 5 is disposed only on the top side (see FIG. 7), minimal values where changes in radiation sound pressure are particularly rapid occur at frequencies around 400 Hz and in a frequency band of 500 to 600 Hz. Further, it is seen that, in the sound pressure frequency characteristic (characteristic shown by a solid line in FIG. 8) obtained when the actuator 4 is disposed only on the hinge side (see FIG. 6), minimal values where changes in radiation sound pressure are particularly rapid occur in a frequency band around 1 to 2 kHz. On the other hand, it is seen that, in the sound pressure frequency characteristic (see FIG. 9) obtained with the structure in which the actuators are disposed on the top side and the hinge side, respectively (see FIG. 2), rapid changes in radiation sound pressure due to frequency changes are suppressed.

Further, from the sound pressure frequency characteristic shown in FIG. 9, it is also seen that not only the rapid changes in radiation sound pressure due to frequency changes are suppressed, but also the radiation sound pressures are increased in level over the entire frequency band as compared with the radiation sound pressures in the individual sound pressure frequency characteristics shown in FIG. 8.

The effect of suppressing a rapid change in radiation sound pressure due to a frequency change is obtained by disposing individual actuators at a plurality of portions where the arrangements of internal components present in the vicinities thereof differ from each other. As already described, this effect can be further enhanced by changing an attaching manner per actuator or by changing, per actuator, the states of a vibrator in the vicinities of the actuators.

Herein, the case is shown in which the two actuators 4 and 5 are disposed in the portable telephone 50. However, the portable telephone 50 may be provided with three or more actuators. In this case, if there is a frequency at which the difference between a radiation sound pressure generated by driving only any one of the actuators and a radiation sound pressure generated by driving only any other actuator becomes 3 dB or more, a change in radiation sound pressure due to a frequency change can be moderated by driving the respective actuators simultaneously.

Further, when the respective actuators are simultaneously driven, the radiation sound pressure level increases due to a combination of radiation sound pressures as compared with the case where the individual actuators are separately driven. This increase in level may be generated over the entire reproduction frequency band of an audio source (audio signals) or may be generated at a portion of the reproduction frequency band of the audio source. For example, it is assumed that a 48 kHz sampling audio source is used as an audio source. In this case, the radiation sound pressure level may increase over the whole of 10 Hz to 24 kHz being a reproduction frequency band of the audio source as compared with the case where the individual actuators are separately driven. Alternatively, the radiation sound pressure level may increase only in a frequency band which is part of the reproduction frequency band of 10 Hz to 24 kHz.

Although the sound pressure frequency characteristics have been described in FIGS. 8 and 9, this also applies to the vibration frequency characteristics. That is, it is assumed that maximal or minimal values where the vibration velocity of the vibrator rapidly changes occur in the respective vibration frequency characteristics obtained by separately driving the individual actuators. Even in this case, if there is a frequency at which the difference between a vibration velocity of the vibrator generated by driving only any one of the actuators and a vibration velocity of the vibrator generated by driving only any other actuator becomes 3 dB or more, a change in vibration velocity due to a frequency change can be moderated by driving the respective actuators simultaneously.

Next, a description will be given of radiation of stereophonic sound by a plurality of actuators (multichannel audio reproduction). In the range of frequencies of 3 kHz and higher, the directivity of radiated sounds is high so that respective channels are relatively easily separated from each other. That is, sounds radiated by excitation of a plurality of actuators are easily separated from each other. Therefore, in this invention, the range of frequencies of 3 kHz and higher is used to contribute to the multichannel audio reproduction. Radiated sounds tend to spread in the range of frequencies of less than 3 kHz and, therefore, the frequencies of less than 3 kHz are not suitable for realizing the multichannel audio reproduction. Accordingly, in this invention, the range of frequencies of less than 3 kHz is used to contribute to the flattening of the sound pressure frequency characteristics or the vibration frequency characteristics and the range of frequencies of 3 kHz and higher is used to contribute to the multichannel audio reproduction.

Hereinbelow, in order to facilitate a description, the description will be given assuming that a portable telephone has two actuators.

In order to radiate stereophonic sound that makes a user of a terminal feel the spatial spreading, it is necessary that vibration of a vibrator generated by each actuator hardly exert any influence on a region close to the other actuator. Further, it is necessary that the particle velocity of air molecules generated by vibration of each actuator hardly exert any influence on the particle velocity of air molecules close to the other actuator. For this purpose, it is required that an isolation of 10 dB or more be ensured between a vibration velocity of the vibrator close to and generated by one of the actuators and a vibration velocity of the vibrator in a region close to the other actuator or that an isolation of 10 dB or more be ensured between a particle velocity of air molecules close to and generated by vibration of one of the actuators and a particle velocity of air molecules close to the other actuator.

Herein, the requirement that an isolation of 10 dB or more be ensured between a vibration velocity of the vibrator close to and generated by one of the actuators and a vibration velocity of the vibrator in a region close to the other actuator means that when only one of the actuators is driven, there be a difference of 10 dB or more between a vibration velocity of the vibrator close to the driven actuator and generated by the driven actuator and a vibration velocity of the vibrator in a region close to the other actuator not driven. Likewise, the requirement that an isolation of 10 dB or more be ensured between a particle velocity of air molecules close to and generated by vibration of one of the actuators and a particle velocity of air molecules close to the other actuator means that when only one of the actuators is driven, there be a difference of 10 dB or more between a particle velocity of air molecules (radiation sound pressure) close to the driven actuator and generated by vibration of the driven actuator and a particle velocity of air molecules (radiation sound pressure) close to the other actuator not driven.

Further, "close to an actuator" represents a range of 1 cm around the actuator. Therefore, when measuring the isolation of particle velocity of air molecules (radiation sound pressure) paying attention to one actuator, a microphone is disposed at a distance of 1 cm from the actuator on a normal of a vibrator (e.g. an image element protective screen) passing through the center of the actuator and, further, a microphone is disposed at a distance of 1 cm from the other actuator on a normal of the vibrator passing through the center of the other actuator. Then, in the state where only the aimed actuator is driven and the other actuator is stopped, the particle velocities of air molecules (radiation sound pressures) are measured using the respective microphones, thereby confirming whether the particle velocity (radiation sound pressure) measured by the microphone corresponding to the driven actuator differs by 10 dB or more from (is higher by 10 dB or more than) the particle velocity measured by the other microphone.

On the other hand, when measuring the isolation of vibration velocity of a vibrator, the vibration velocity of the vibrator close to an aimed actuator (driven actuator) and the vibration velocity of the vibrator close to the other actuator stopped are measured using a laser scanning measurement system, thereby confirming whether the vibration velocity close to the driven actuator differs by 10 dB or more from (is higher by 10 dB or more than) the vibration velocity close to the other actuator.

In order to ensure the isolation of 10 dB or more as described above, it is preferable that no large difference be generated in the range of 3 kHz and higher in the sound pressure frequency characteristics obtained by independently driving the individual actuators. As already described, when the sound pressure frequency characteristics obtained by independently driving the individual actuators at their respective disposed positions are compared with each other, the difference in radiation sound pressure between the actuators is small at frequencies of 3 kHz and higher. Therefore, it is often not necessary to perform particular signal processing for changing the radiation sound pressure level in the range of 3 kHz and higher. However, there is a possibility that the difference in radiation sound pressure between the actuators becomes large at frequencies of 3 kHz and higher and, in that event, signal processing may be carried out so as to match the radiation sound pressure levels between the actuators. In this signal processing, the radiation sound pressure levels are matched between the actuators by, for example, lowering the high radiation sound pressure level or raising the low radiation sound pressure level.

The signal processing may be performed by a DSP (Digital Signal Processor) incorporated in a portable telephone. Alternatively, an LSI dedicated for signal processing may be provided in a portable telephone and carry out the signal processing.

In order to increase the isolation, it is required to increase the distance between the actuators. However, the distance that can provide the foregoing isolation of 10 dB or more differs depending on a material of the vibrator with the actuators disposed thereon, the type of actuators, and so on. In the case of disposing the actuators on the hinge side and the top side, respectively, of the image element protective screen 2 of the foldable portable telephone 50 as illustrated in FIG. 2, the distance between the actuators is often set to 5 cm or more (e.g. 6 cm). With such a distance, it is possible to achieve the foregoing isolation of 10 dB or more.

As already described, an acrylic board has the properties of high mechanical hardness and high Q value. The acrylic board further has the following property. That is, the acrylic board has the property in which when an actuator is disposed thereon and driven, the amount of vibration becomes large at the actuator disposed position, but distance damping of high frequencies is large. That is, it has the property in which high-frequency vibration is damped as going away from the disposed position of the driven actuator. This property is suitable for achieving the foregoing isolation of 10 dB or more. Therefore, in view of the multichannel audio reproduction, it is preferable to use the acrylic board as the image element protective screen 2 in the case where the actuators are attached to the image element protective screen 2.

The directivity of radiated sounds is high in the range of frequencies of 3 kHz and higher, which has already been described. However, as a user of a portable telephone goes away from a vibrator (a case or an image element protective screen) of the portable telephone, sounds produced by vibration of respective actuators tend to be mixed together. Signal processing may be performed to solve this sound mixing. In this signal processing, the vibration phase may be slightly shifted per actuator disposed position at frequencies of at least 3 kHz and higher. Herein, slightly shifting the vibration phase represents shifting the vibration phase with a vibration phase shift amount in the range of 0° to 90°. However, the phase shift amount may exceed 90°. Even if the sound mixing occurs, the user still can feel the stereophonic sound and, therefore, the signal processing for shifting the phase as described above is not necessarily performed.

Further, by adjusting the vibration phase shift amount, it is also possible to control a vibration manner of a vibrator such as an image element protective screen. For example, by adjusting the vibration phase shift amount, it is possible to prevent vibration whose amplitude becomes larger at the center portion of the image element protective screen than at end portions thereof.

Figure 10:
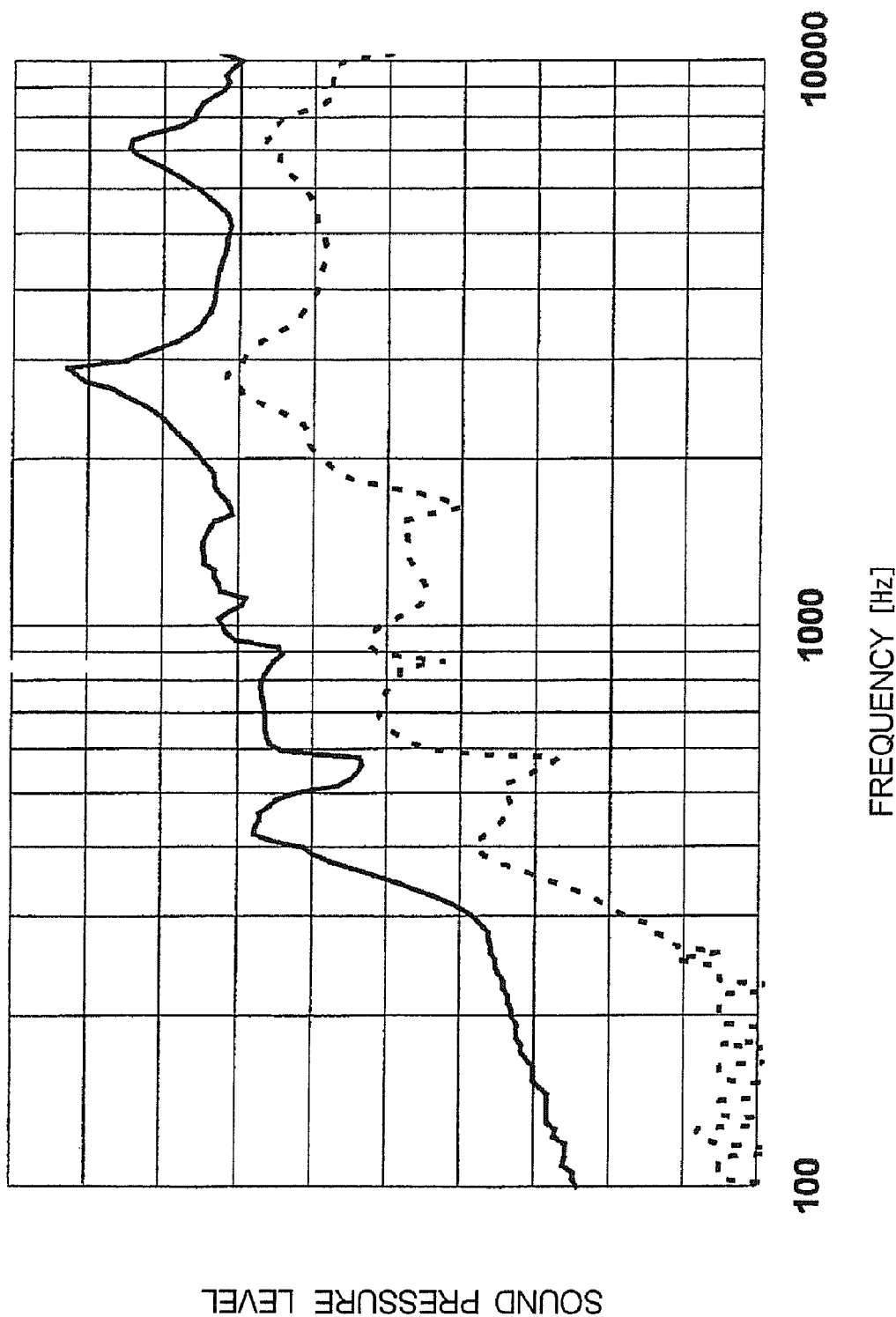
FIG. 10 is an explanatory diagram showing a specific example of sound pressure frequency characteristics demonstrating that the isolation between a sound pressure close to and generated by one actuator and a sound pressure in a region close to the other actuator is 10 dB or more.

Next, there is shown a specific example of sound pressure frequency characteristics demonstrating that the isolation between a sound pressure close to and generated by one actuator and a sound pressure in a region close to the other actuator is 10 dB or more. FIG. 10 is a frequency characteristic diagram showing such a specific example of the sound pressure frequency characteristics. The sound pressure frequency characteristics shown in FIG. 10 were measured by driving only an actuator on the top side in a portable telephone with the structure as illustrated in FIG. 2. In the measurement of the sound pressure frequency characteristics shown in FIG. 10, use was made of a portable telephone and actuators different from those used in the measurement of the sound pressure frequency characteristics shown in FIGS. 8 and 9. However, since the structure of the portable telephone and the arrangement of the actuators used in the measurement of the characteristics shown in FIG. 10 are the same as those illustrated in FIG. 2, a description will be given hereinbelow with reference to FIG. 2 using the symbols shown in FIG. 2.

In FIG. 10, the scale of the axis of ordinates is 10 dB/div.

A microphone was disposed at a distance of 1 cm from an actuator 5 on the top side on a normal of an image element protective screen 2 passing through the center of the actuator 5. Further, a microphone was disposed at a distance of 1 cm from an actuator 4 on the hinge side on a normal of the image element protective screen 2 passing through the center of the actuator 4. Then, in the state where only the actuator 5 on the top side is driven and the actuator 4 on the hinge side is stopped, the radiation sound pressures were measured using the respective microphones. The distance between the actuators 4 and 5 was set to 6 cm.

The sound pressure frequency characteristic shown by a solid line in FIG. 10 is a sound pressure frequency characteristic measured by the microphone disposed close to the driven actuator 5 on the top side. The sound pressure frequency characteristic shown by a broken line in FIG. 10 is a sound pressure frequency characteristic measured by the microphone disposed close to the stopped actuator 4 on the hinge side. As shown in FIG. 10, the radiation sound pressure (particle velocity of air molecules) close to the actuator 5 on the top side is higher by 10 dB or more than the radiation sound pressure close to the actuator 4 on the hinge side. Therefore, when the actuator 5 is driven, an isolation of 10 dB or more is achieved with respect to radiation sound pressures (particle velocities of air molecules) close to the actuator 5 and close to the actuator 4.

FIG. 10 shows the case where the actuator 5 is driven, but this also applies to the case where only the actuator 4 on the hinge side is driven.

FIG. 10 shows that there is the difference of 10 dB or more with respect to the radiation sound pressures (particle velocities of air molecules). Also with respect to the vibration velocities of the vibrator, a difference of 10 dB or more is required between a vibration velocity close to the driven actuator and a vibration velocity close to the stopped other actuator.

As already described, the vibration frequency characteristic and the sound pressure frequency characteristic are generally in a corresponding relationship. Therefore, it can be said that if an isolation of 10 dB or more is achieved with respect to the vibration velocities of the vibrator, an isolation of 10 dB or more is achieved also with respect to the particle velocities of air molecules. Likewise, it can be said that if an isolation of 10 dB or more is achieved with respect to the particle velocities of air molecules, an isolation of 10 dB or more is achieved also with respect to the vibration velocities of the vibrator. Therefore, when only one of the actuators is driven, a difference of 10 dB or more is required between a vibration velocity of the vibrator close to the driven actuator and generated by the driven actuator and a vibration velocity of the vibrator in a region close to the other actuator not driven. Alternatively, when only one of the actuators is driven, a difference of 10 dB or more is required between a particle velocity of air molecules close to the driven actuator and generated by vibration of the driven actuator and a particle velocity of air molecules close to the other actuator not driven.

Next, a description will be given of a manner of use of a portable telephone when a user listens to the stereophonic sound. When the user listens to the stereophonic sound radiated from a vibrator, it is necessary that respective actuators vibrate the vibrator at different positions in the horizontal direction to thereby radiate a sound. Accordingly, it is necessary to change the direction of the portable telephone and rotate a case, attached with the actuators, with respect to the other case so that the actuators are arranged at the different positions in the horizontal direction.

Figure 11:
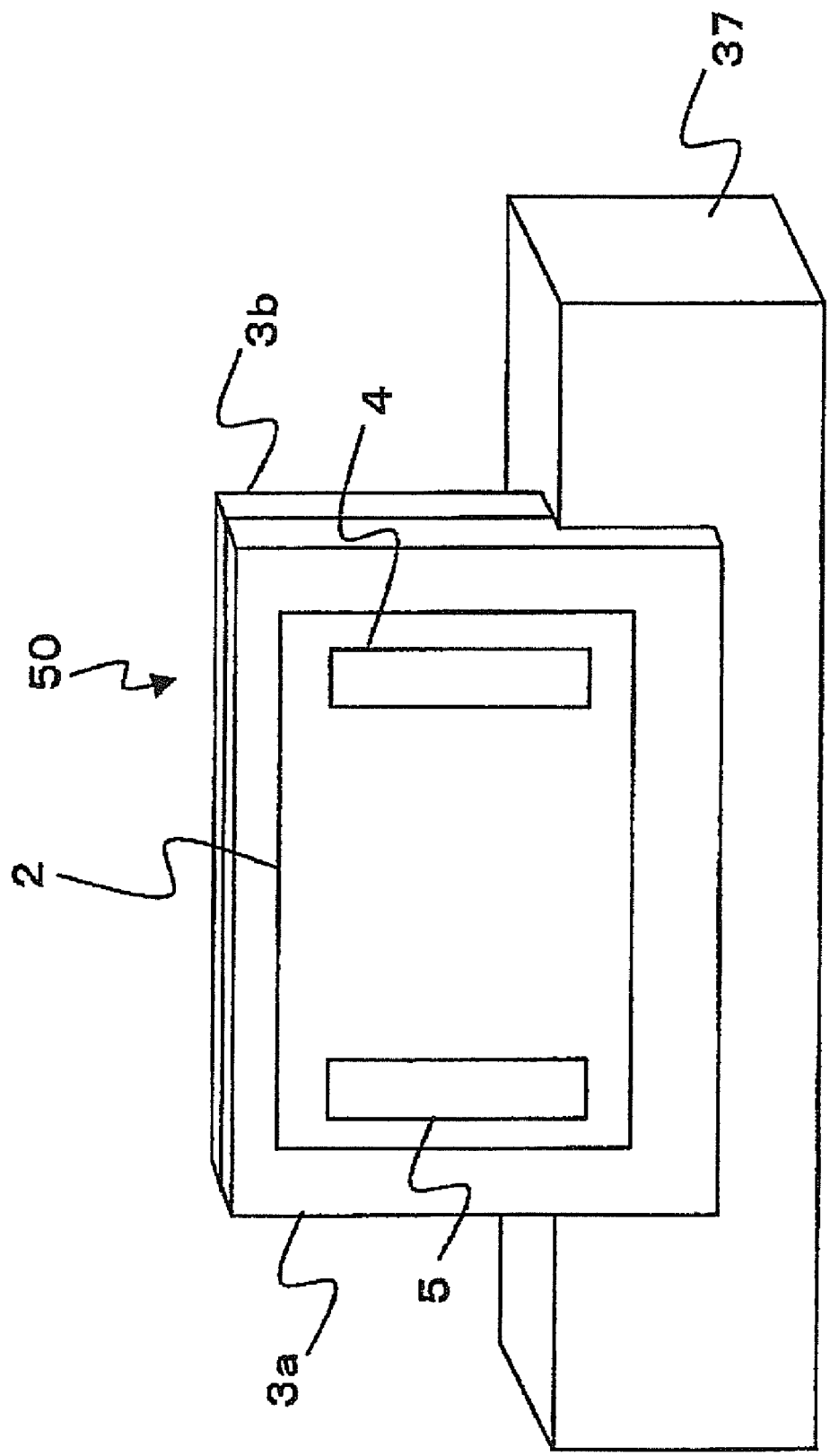
FIG. 11 is an explanatory diagram showing an example in which the direction of a portable telephone is changed so that respective actuators are aligned in the horizontal direction.

FIG. 11 is an explanatory diagram showing an example in which the direction of the portable telephone 50 with the structure illustrated in FIG. 2 is changed so that the actuators are aligned in the horizontal direction. In FIG. 11, illustration of the hinge 51 (see FIG. 2) is omitted. In the example shown in FIG. 11, the portable telephone 50 is in a folded state so that the image element protective screen 2 with the actuators 4 and 5 disposed thereon faces outward. Further, the portable telephone 50 is placed on a support stage 37 so that the actuators 4 and 5 are arranged at the different positions in the horizontal direction. By vibrating the image element protective screen 2 with the actuators 4 and 5 in this state, it is possible to radiate stereophonic sound that makes the user feel the spatial spreading. An image may be simultaneously displayed on a display device (not shown).

The support stage 37 is, for example, a charging adapter for the portable telephone 50. Alternatively, a cradle may be used as the support stage 37.

When rotating the case, attached with the actuators, with respect to the other case, the first case 3a and the second case 3b may be connected to each other using, for example, a universal hinge instead of the hinge 51 illustrated in FIG. 2. Using the universal hinge, the direction of the first case 3a can be changed so that the long-axis direction of the first case 3a becomes perpendicular to the long-axis direction of the second case 3b. Therefore, the direction of the first case 3a can be changed so that the actuators 4 and 5 are arranged at the different positions in the horizontal direction. Although the case is shown here in which the first case 3a and the second case 3b are connected to each other by the universal hinge, it may be configured that the first case 3a and the second case 3b are connected to each other by a rotation shaft perpendicular to the cases 3a and 3b and the first case 3a is rotatable about the rotation shaft. Even in the case of such a structure, the direction of the first case 3a can be changed by rotating the first case 3a by 90° about the rotation shaft so that the actuators 4 and 5 are arranged at the different positions in the horizontal direction.

Herein, referring to FIG. 2 and so on, the description has been given of the example in which the two actuators are used. However, the multichannel audio reproduction (radiation of stereophonic sound) may also be realized using three or more actuators.

Hereinbelow, there are shown modifications about combinations of actuators and attaching positions of actuators.

Figure 12:
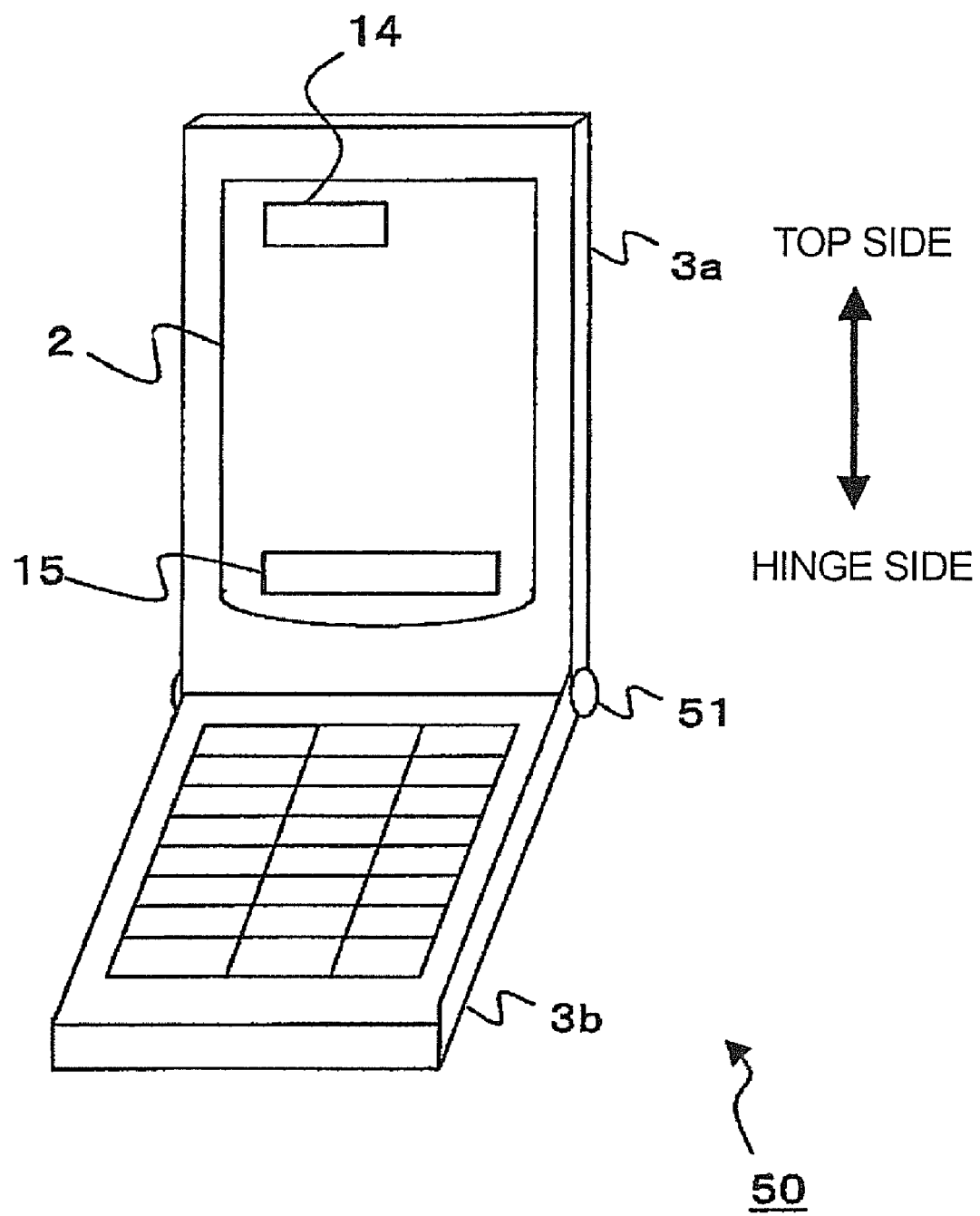
FIG. 12 is an explanatory diagram showing a structural example in which two actuators with different specifications are attached.

FIG. 2 shows the case where the characteristics (characteristics under the same conditions) of the two actuators 4 and 5 are the same as each other. The specifications and characteristics (characteristics under the same conditions) of the actuators provided in the portable telephone 50 may differ from each other. FIG. 12 is an explanatory diagram showing a structural example in which two actuators with different specifications are attached. The same structural portions as those in FIG. 2 are assigned the same symbols as those in FIG. 2, thereby omitting explanation thereof. In FIG. 12, there is shown an example in which an actuator 14 is attached to an image element protective screen 2 on the top side and an actuator 15 with a specification different from that of the actuator 14 is attached to the image element protective screen 2 on the hinge side. The actuators 14 and 15 differ in their specifications and thus have mutually different shapes.

As shown in FIG. 12, since the actuators 14 and 15 not only differ in their disposed places, but also differ in their shapes themselves, the sound pressure frequency characteristic obtained by driving only the actuator 14 on the top side and the sound pressure frequency characteristic obtained by driving only the actuator 15 on the hinge side differ from each other more than the case where two actuators are the same in specification. Therefore, it is possible to enhance the effect of flattening of the sound pressure frequency characteristics when the two actuators are simultaneously driven. Although the description has been given of the sound pressure frequency characteristics herein, this also applies to the vibration frequency characteristics.

Further, even in the case of using the actuators with different specifications, if an isolation of 10 dB or more is achieved between a vibration velocity of the vibrator close to and generated by one of the actuators and a vibration velocity of the vibrator in a region close to the other actuator or if an isolation of 10 dB or more is achieved between a particle velocity of air molecules (radiation sound pressure) close to and generated by vibration of one of the actuators and a particle velocity of air molecules (radiation sound pressure) close to the other actuator, the multichannel audio reproduction can also be realized.

Figure 13:
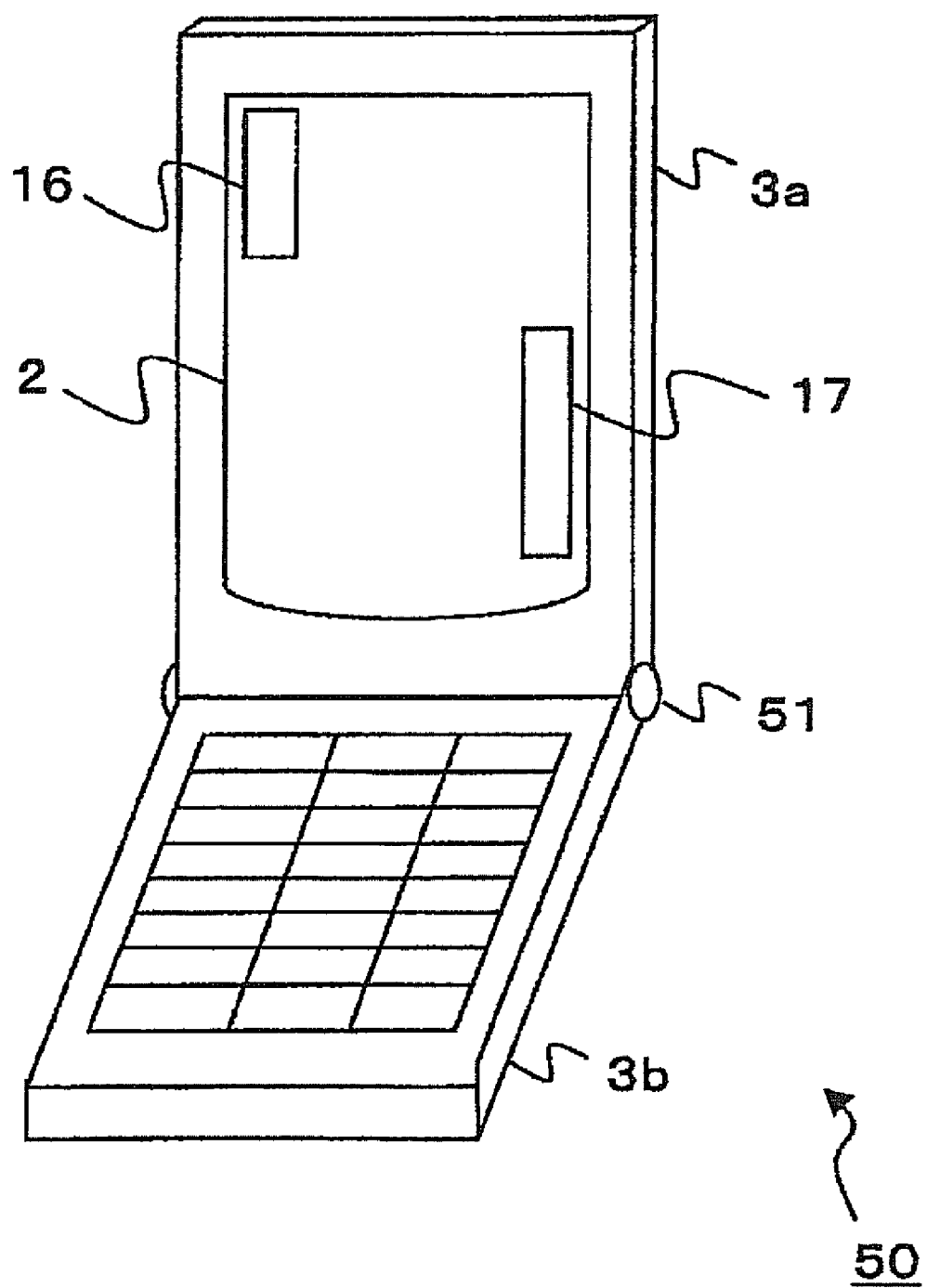
FIG. 13 is an explanatory diagram showing a structural example in which actuators are attached to an image element protective screen along its left and right sides, respectively, i.e. one for each side.

FIGS. 2 and 12 each show the structure in which the actuators are disposed on the top side and the hinge side, respectively, of the image element protective screen 2. It may be configured that the actuators are attached to the image element protective screen 2 along its left and right sides, respectively, i.e. one for each side. FIG. 13 is an explanatory diagram showing a structural example in which actuators are attached to an image element protective screen 2 along its left and right sides, respectively, i.e. one for each side. The same structural portions as those in FIG. 2 are assigned the same symbols as those in FIG. 2, thereby omitting explanation thereof. In FIG. 13, there is shown an example in which an actuator 16 is attached to the image element protective screen 2 along its left side and an actuator 17 is attached to the image element protective screen 2 along its right side. Further, in FIG. 13, the case is shown in which the actuators 16 and 17 differ in specification from each other. Since the actuators 16 and 17 are attached at the left and right sides, respectively, the disposed positions of the actuators 16 and 17 in the horizontal direction differ from each other. Also in the structure illustrated in FIG. 13, it is possible to obtain the effect of suppressing a rapid change in radiation sound pressure due to a frequency change or the effect of suppressing a rapid change in vibration velocity of the vibrator due to a frequency change.

Further, if an isolation of 10 dB or more is achieved between a vibration velocity of the vibrator close to and generated by one of the actuators and a vibration velocity of the vibrator in a region close to the other actuator or if an isolation of 10 dB or more is achieved between a particle velocity of air molecules (radiation sound pressure) close to and generated by vibration of one of the actuators and a particle velocity of air molecules (radiation sound pressure) close to the other actuator, the multichannel audio reproduction can also be realized. Particularly, in the structure shown in FIG. 13, since the actuators 16 and 17 are disposed at the different positions in the horizontal direction from the first, the multichannel audio reproduction can be realized without changing the direction of a portable telephone 50 or the direction of a first case 3a having the actuators 16 and 17. In the case of the structure illustrated in FIG. 13, the distance between the actuators in the horizontal direction becomes, for example, about 3 cm, but even with such a distance, it is possible to achieve an isolation of 10 dB or more depending on the type of actuators, a material of the vibrator, and so on.

In FIG. 13, the case is shown in which the left and right actuators 16 and 17 differ in specification. However, the actuators 16 and 17 disposed on the left and right may be the same in specification.

Figure 14:
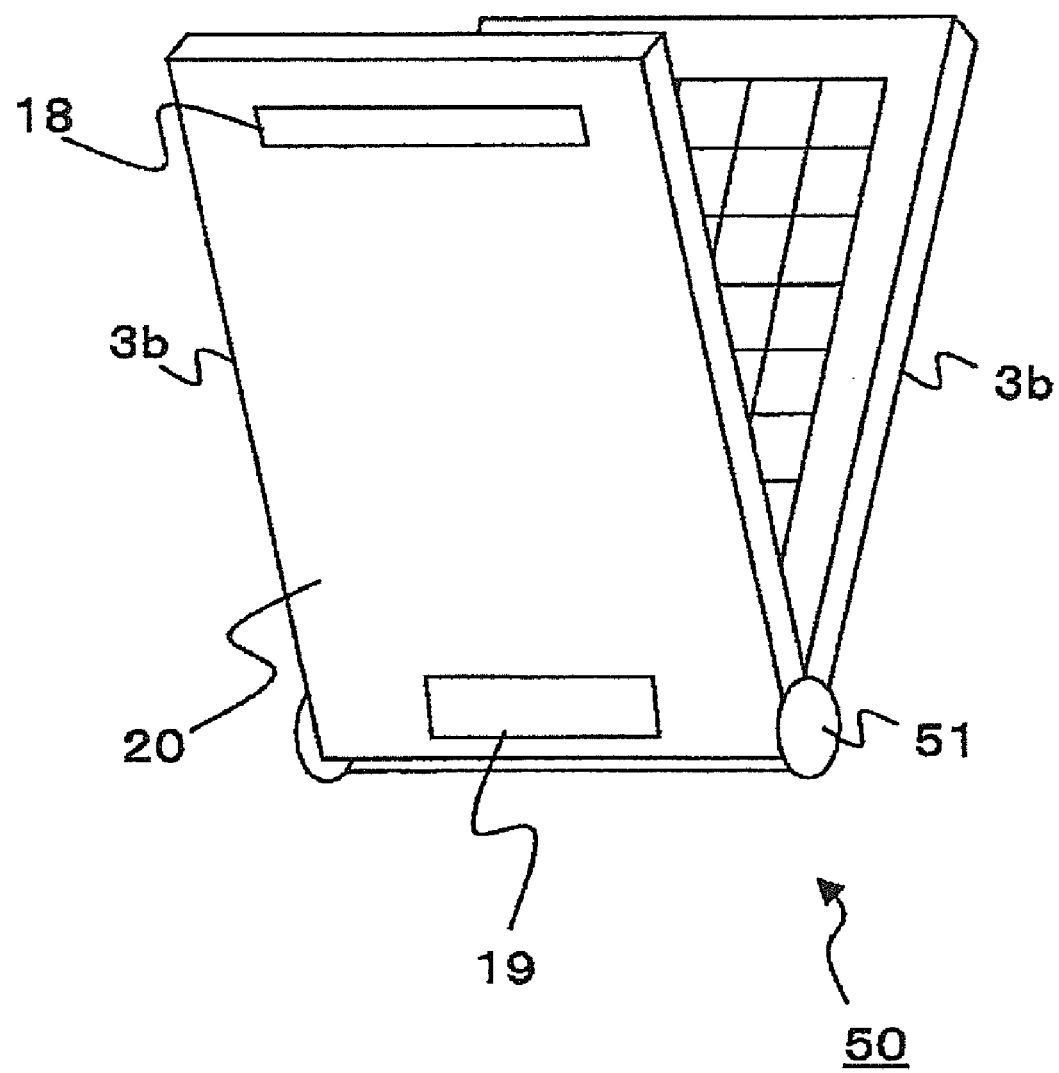
FIG. 14 is an explanatory diagram showing a structural example in which a plurality of actuators are attached to a case.

FIGS. 2, 12, and 13 each show the case where the actuators are disposed on the image element protective screen 2, but as already described, a plurality of actuators may be attached to the case. FIG. 14 is an explanatory diagram showing a structural example in which a plurality of actuators are attached to a case. The same structural portions as those in FIG. 2 are assigned the same symbols as those in FIG. 2, thereby omitting explanation thereof. In FIG. 14, there is shown an example in which an actuator 18 is attached to a back surface 20 of a first case 3a on the top side and an actuator 19 is attached thereto on the hinge side. Further, in FIG. 14, the case is shown in which the actuators 18 and 19 differ in specification. The back surface 20 is a surface on the side opposite to a surface where an image element protective screen 2 (not shown in FIG. 14) is disposed.

When actuators are attached to the image element protective screen 2, the image element protective screen 2 serves as a main sound radiator. On the other hand, when actuators are attached to the first case 3a, the first case 3a serves as a main sound radiator. Since the area of the first case 3a is greater than that of the image element protective screen 2, when the actuators are attached to the first case 3a, the radiation area can be enlarged and, as a result, the radiation sound pressure level can be further improved.

In FIG. 14, the case is shown in which the actuators 18 and 19 differ in specification. However, the actuators 18 and 19 may be the same in specification. Further, the actuators 18 and 19 may be attached to the back surface 20 along its left and right sides. Further, as already described, the actuators 18 and 19 may be attached to the outer side surface of the first case 3a or may be attached to its surface facing the inner side.

Figure 15:
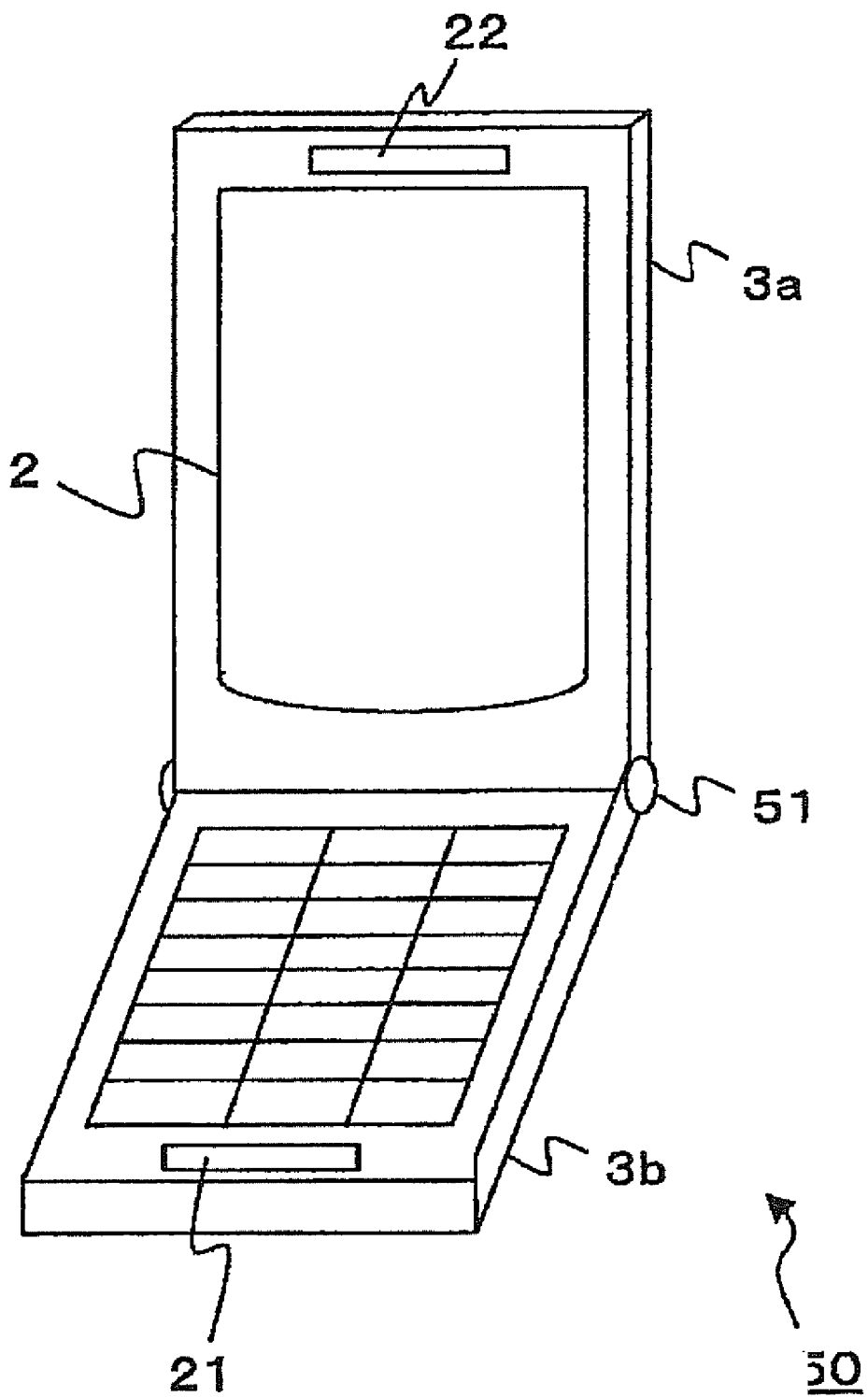
FIG. 15 is an explanatory diagram showing a structural example in which an actuator is attached to each of cases of a portable telephone.

In the case where a portable telephone has two cases, it may be configured that each case has an actuator. FIG. 15 is an explanatory diagram showing a structural example in which an actuator is attached to each of cases of a portable telephone. The same structural portions as those in FIG. 2 are assigned the same symbols as those in FIG. 2, thereby omitting explanation thereof. In the example of FIG. 15, an actuator 22 is attached to a first case 3a and an actuator 21 is attached to a second case 3b. The actuator 22 on the first case side may be attached to an image element protective screen 2.

It may be configured that a sound is not radiated from the entire surface of a vibrator, but radiated from a portion of the vibrator. In the case of radiating the sound from the portion of the vibrator, a recess may be provided at the portion of the vibrator so that the thickness of the vibrator in a region at that portion becomes thinner than in the other region. Then, a plurality of actuators may be disposed in the recess (the region whose thickness is smaller than that of the other region of the vibrator). When the actuators are driven, the region of the recess, reduced in thickness so as to be more liable to vibrate than the other region, vibrates so that a sound is radiated from that region, not from the whole of the vibrator.

Figure 16:
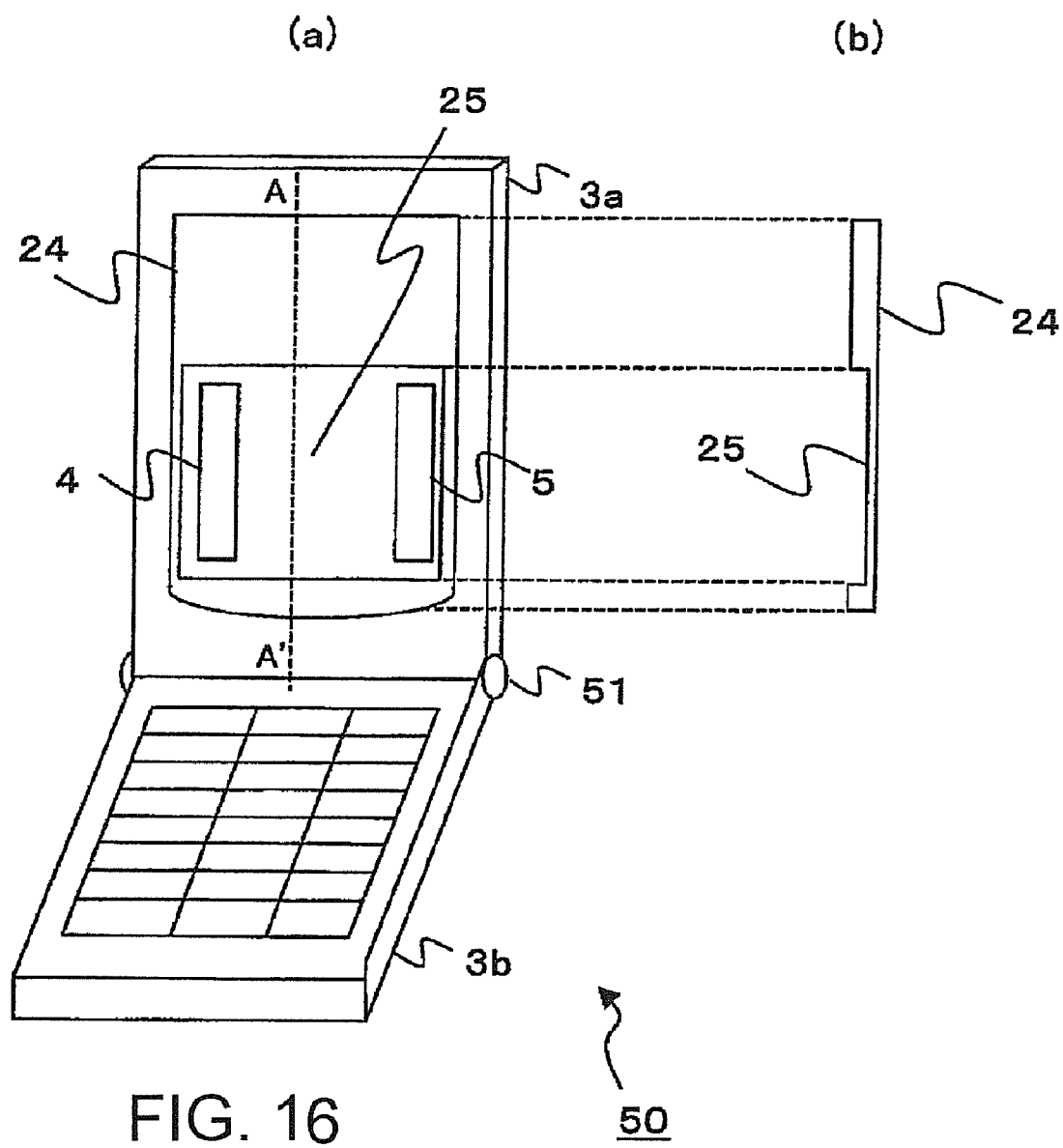
FIG. 16 is an explanatory diagram showing an example of a structure in which a sound is radiated from a portion of an image element protective screen.

FIG. 16 is an explanatory diagram showing an example of a structure in which a sound is radiated from a portion of an image element protective screen. The same structural portions as those in FIG. 2 are assigned the same symbols as those in FIG. 2, thereby omitting explanation thereof. FIG. 16, (a) is an explanatory diagram showing the disposed positions of actuators. FIG. 16, (b) is an explanatory diagram showing a sectional shape of an image element protective screen taken along line A-A' shown in FIG. 16, (a).

A first case 3a has an image element protective screen 24 provided with a recess 25 in a partial region thereof. In the example shown in FIG. 16, the recess 25 is rectangular. Actuators 4 and 5 are attached on both left and right sides, respectively, in the recess 25 of the image element protective screen 24. The arrangements of internal components of a portable telephone in the vicinities of the actuators 4 and 5 differ from each other.

As shown in FIG. 16, (b), the thickness of the image element protective screen 24 is smaller at the recess 25 than at the other region (the region other than the recess 25). By driving the respective actuators 4 and 5 attached in the recess, a sound can be radiated from the region of the recess 25, not from the whole of the image element protective screen 24.

Further, if an isolation of 10 dB or more is achieved between a vibration velocity of the vibrator close to and generated by one of the actuators and a vibration velocity of the vibrator in a region close to the other actuator or if an isolation of 10 dB or more is achieved between a particle velocity of air molecules close to and generated by vibration of one of the actuators and a particle velocity of air molecules close to the other actuator, the multichannel audio reproduction can also be realized.

In FIG. 16, the case is shown in which a sound is radiated from a portion of the image element protective screen. However, this also applies to the case where a sound is radiated from a partial region of a surface of the case. For example, in the case of radiating a sound from a partial region of the back surface 20 (see FIG. 14) of the first case 3a, a recess may be provided in the partial region of the back surface 20 and a plurality of actuators may be attached in the recess.

In the foregoing description, the foldable portable telephone is shown as a portable telephone. However, this invention is applicable to various portable telephones such as a candybar (straight) portable telephone and a slide portable telephone. Further, this invention is also applicable to terminals other than portable telephones.

INDUSTRIAL APPLICABILITY

This invention is applied to a terminal, a speaker provided in a terminal, and an image element protective screen or a case of a terminal.

The invention claimed is:

1. A speaker comprising an image element protective screen of a terminal or a case of a terminal as a vibrator, and first and second actuators vibrating the vibrator, wherein:
   said first and second actuators are disposed on a surface of the vibrator;
   the speaker further comprises at least one of a weight or a hole portion arranged on the vibrator;
   the weight is attached to the vibrator closer to the second actuator than the first actuator; and
   the hole portion is formed on the vibrator closer to the second actuator than the first actuator.

2. A speaker according to claim 1, wherein when said actuators independently vibrate the vibrator, sound pressure frequency characteristics each indicative of a change in radiation sound pressure due to a frequency change differ from each other between said actuators.

3. A speaker according to claim 1, wherein when said actuators independently vibrate the vibrator, vibration frequency characteristics each indicative of a change in vibration velocity of said image element protective screen or said case due to a frequency change differ from each other between said actuators.

4. A speaker according to claim 1, wherein when only one of said actuators is driven, a vibration velocity of the vibrator generated by said driven actuator and a vibration velocity of the vibrator not driven differ from each other by 10dB or more.

5. A speaker according to claim 1, wherein when only one of said actuators is driven, a radiation sound pressure generated by vibration of said driven actuator and a radiation sound pressure not driven differ from each other by 10dB or more.

6. A speaker according to claim 1, wherein when all of said actuators are driven, a radiation sound pressure increases over the whole of or in a portion of a reproduction frequency band of an audio signal as compared with a case where one of said actuators is driven.

7. A speaker according to claim 1, wherein each of said actuators is one of a piezoelectric actuator, an electrostatic actuator, an electromagnetic actuator, and a magnetostrictive actuator.

8. A speaker according to claim 1, wherein said actuators are disposed only at the surface of said image element protective screen.

9. A speaker according to claim 1, wherein said actuators are disposed only at the surface of said case of said terminal.

10. A speaker according to claim 1, wherein said actuators are disposed at both the surface of said image element protective screen and the surface of said case of said terminal.

11. An image element protective screen attached to a terminal for protecting a display device of said terminal, said image element protective screen comprising first and second actuators vibrating the image element protective screen, the first and second actuators being disposed on a surface of said image element protective screen, wherein:
   the image element protective screen further comprises at least one of a weight or a hole portion;
   the weight is attached to the image element protective screen closer to the second actuator than the first actuator; and
   the hole portion is formed on the image element protective screen closer to the second actuator than the first actuator.

12. A case of a terminal, said case comprising first and second actuators vibrating the case, the first and second actuators being disposed on a surface of said case, wherein:
   the case further comprises at least one of a weight or a hole portion;
   the weight is attached to the case closer to the second actuator than the first actuator; and
   the hole portion is formed on the case closer to the second actuator than the first actuator.

13. A terminal characterized by comprising the speaker according to claim 1.

14. A speaker according to claim 1, wherein the first and the second actuators are different in size from each other.

15. A speaker according to claim 1, wherein one of the first and the second actuators is embedded in the vibrator, whereas the other of the first and the second actuators is not embedded in the vibrator.

16. A speaker according to claim 1, wherein:
   the first and the second actuators are attached to the vibrator with the use of adhesive, respectively; and
   wherein the first and the second actuators are different in the adhesive application area from each other.

17. A speaker according to claim 1, wherein:
   the first and the second actuators are attached to the vibrator through cushion members, respectively; and
   wherein the first and the second actuators are different in the cushion member area from each other.

* * * * *